US011290344B2

(12) United States Patent
Wang et al.

(10) Patent No.: US 11,290,344 B2
(45) Date of Patent: Mar. 29, 2022

(54) POLICY-DRIVEN METHOD AND APPARATUS

(71) Applicant: Huawei Technologies Co., Ltd., Shenzhen (CN)

(72) Inventors: Yuanyuan Wang, Shanghai (CN); Yan Wang, Shanghai (CN); Yixu Xu, Shanghai (CN); Jin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/988,313

(22) Filed: Aug. 7, 2020

(65) Prior Publication Data

US 2020/0374201 A1 Nov. 26, 2020

Related U.S. Application Data

(63) Continuation of application No. PCT/CN2018/118154, filed on Nov. 29, 2018.

(30) Foreign Application Priority Data

Feb. 7, 2018 (CN) .......................... 201810123852.8

(51) Int. Cl.
*G06F 15/173* (2006.01)
*H04L 41/147* (2022.01)
(Continued)

(52) U.S. Cl.
CPC ........ *H04L 41/147* (2013.01); *H04L 41/0893* (2013.01); *H04L 41/145* (2013.01)

(58) Field of Classification Search
CPC .. H04L 41/147; H04L 41/0893; H04L 41/145
See application file for complete search history.

(56) References Cited

U.S. PATENT DOCUMENTS

2007/0150936 A1 6/2007 Maes
2010/0114554 A1 5/2010 Misra
(Continued)

FOREIGN PATENT DOCUMENTS

CN 101141307 A 3/2008
CN 101431430 A 5/2009
(Continued)

OTHER PUBLICATIONS

"Discussion on big data and 5G," SA WG2 Meeting #125, Gothenburg, Sweden, S2-181250, total 14 pages, 3rd Seneration Partnership Project, Valbonne, France (Jan. 22-26, 2018).
(Continued)

*Primary Examiner* — Wing F Chan
*Assistant Examiner* — Joseph R Maniwang
(74) *Attorney, Agent, or Firm* — Leydig, Voit & Mayer, Ltd.

(57) ABSTRACT

A policy-driven method and an apparatus are disclosed. The method includes: obtaining at least one policy from a modeling function network element; receiving a first policy identifier triggered by a first model from a prediction function network element, where the first policy identifier is used to identify a first policy; determining the first policy in the at least one policy based on the first policy identifier, where the first policy includes action information corresponding to the first action; executing the first action in the first policy; and sending an execution result of the first action to a data service function network element or the prediction function network element, where the execution result of the first action is used as input data of a second model.

16 Claims, 17 Drawing Sheets

(51) Int. Cl.
*H04L 41/0893* (2022.01)
*H04L 41/14* (2022.01)

(56) References Cited

U.S. PATENT DOCUMENTS

| | | |
|---|---|---|
| 2014/0101634 A1 | 4/2014 | Abbasipour et al. |
| 2016/0028599 A1 | 1/2016 | Vasseur et al. |
| 2016/0080502 A1 | 3/2016 | Yadav et al. |

FOREIGN PATENT DOCUMENTS

| | | |
|---|---|---|
| CN | 101777147 A | 7/2010 |
| CN | 107078921 A | 8/2017 |
| CN | 107135084 A | 9/2017 |
| CN | 107590186 A | 1/2018 |

OTHER PUBLICATIONS

"Discussion on big data and 5G," SA WG2 Meeting #125, Gothenburg, Sweden, S2-181230, pp. 1-14, 3rd Generation Partnership Project, Valbonne, France (Jan. 22-26, 2018).

POLICY-DRIVEN METHOD AND APPARATUS

CROSS-REFERENCE TO RELATED APPLICATIONS

This application is a continuation of International Application No. PCT/CN2018/118154, filed on Nov. 29, 2018, which claims priority to Chinese Patent Application No. 201810123852.8, filed on Feb. 7, 2018. The disclosures of the aforementioned applications are hereby incorporated by reference in their entireties.

TECHNICAL FIELD

This application relates to the field of communications technologies, and in particular, to a policy-driven method and an apparatus.

BACKGROUND

In a fifth-generation (5th-Generation, 5G) mobile communications technology system, an original baseband unit (Baseband Unit, BBU) function entity is reconstructed into two function entities: a central unit (Central Unit, CU) and a distributed unit (Distributed Unit, DU). Functions of the CU and the DU are divided based on real-time performance of to-be-processed content. The CU mainly provides a non-real-time wireless upper-layer protocol stack function, and also supports sinking of some core network functions and deployment of an edge application service. The DU mainly provides a physical layer function and a media access control (Media Access Control, MAC) function having a real-time requirement.

After an architecture including the CU and DU is used in the 5G system, the CU and the DU may be implemented by independent hardware. In terms of functions, some core network functions may be moved downward to the CU or even the DU, to implement mobile edge computing. In addition, all original functions such as functions of a layer 1, layer 2, and layer 3 are implemented in the BBU. In the new architecture, the functions of the layer 1, layer 2, and layer 3 may be separated, and are separately implemented in the CU, the DU, or even a remote radio unit (Remote Radio Unit, RRU), to flexibly handle changes in transmission and service requirements.

For specific function division of the CU and the DU in 5G, the foregoing manner is merely used as a feasible reference example. For example, non-real-time functions of the layer 3 and layer 2 may alternatively be implemented in the CU, real-time functions of the layer 2 and some functions of the layer 1 may be implemented in the DU, and the other functions of the layer 1 may be implemented in the RRU.

It can be learned that, after the CU-DU separation architecture is used in the 5G system, traditional BBU and RRU network elements and logical functions thereof change significantly. Manufacturers have not determined a specific implementation solution to division of functions that will be implemented in the CU and functions that will be implemented in the DU.

In a 5G system, function division between network elements and inside the network elements is not determined, and how to use a machine learning (Machine Learning, ML) technology to output a policy in a wireless network is still an unresolved problem. Consequently, in a current 5G system, there is no control mechanism for converting data information in a wireless network into a policy by using a machine learning technology.

SUMMARY

Embodiments of this application provide a policy-driven method and an apparatus, to convert data information in a wireless network into a policy by using a machine learning technology through collaboration of a plurality of function network elements.

To resolve the foregoing problem, the embodiments of this application provide the following technical solutions.

According to a first aspect, an embodiment of this application provides a policy-driven method, including: obtaining, by a policy function network element, at least one policy from a modeling function network element; receiving, by the policy function network element, a first policy identifier triggered by a first model from a prediction function network element, where the first policy identifier is used to identify a first policy; determining, by the policy function network element, the first policy in the at least one policy based on the first policy identifier, where the first policy includes action information corresponding to a first action; executing, by the policy function network element, the first action in the first policy; and sending, by the policy function network element, an execution result of the first action to a data service function network element or the prediction function network element, where the execution result of the first action is used as input data of a second model.

In the foregoing embodiment of this application, the policy function network element may determine the first policy in the at least one policy based on the first policy identifier, and the policy function network element executes the first action in the first policy, and uses the execution result of the first action as the input data of the second model. In this way, the first model and the second model may be jointly executed, and a plurality of models may not need to be coupled together, so that a single model can be reused, to improve model reuse efficiency. In addition, collaboration of a plurality of network elements may further be implemented among the policy function network element, the modeling function network element, the prediction function network element, and the data service function network element. With reference to an ML technology, abundant network information may be used to provide a policy that is most suitable for a current network status, and data information in a wireless network may be converted into a policy by using a plurality of models.

In a possible implementation of the first aspect, the sending, by the policy function network element, an execution result of the first action to a data service function network element or the prediction function network element includes: sending, by the policy function network element, the execution result of the first action to the data service function network element via an interface between the policy function network element and the data service function network element. The interface is configured between the policy function network element and the data service function network element. The policy function network element sends the execution result of the first action to the data service function network element via the interface. A format and communication manner of a transmission protocol are not limited for the interface configured between the data service function network element and the policy function network element. Data may be efficiently transmitted between the policy function network element and the data service function network element via the interface between the policy function network element and the data service function network element.

In a possible implementation of the first aspect, the method further includes: receiving, by the policy function network element, a prediction result of the first model from the prediction function network element; and the executing, by the policy function network element, the first action in the first policy includes: executing, by the policy function network element, the first action that is in the first policy and that corresponds to the prediction result. An output of the first model is the prediction result. The first policy includes the policy identifier, an event, condition information, and action information, and the event may be null or non-null. When the event in the first policy is null, the policy function network element may not need to perform matching between the prediction result of the first model and the event, and the policy function network element may determine the first action based on the first policy. When the event in the first policy is non-null, the policy function network element may perform matching between the prediction result of the first model and the event in the first policy, to determine the first action that is in the first policy and that corresponds to the prediction result.

According to a second aspect, an embodiment of this application provides a policy-driven method, including: obtaining, by a policy function network element, at least one policy from a modeling function network element; receiving, by the policy function network element, a first policy identifier triggered by a first model from a prediction function network element, where the first policy identifier is used to identify a first policy; determining, by the policy function network element, the first policy in the at least one policy based on the first policy identifier, where the first policy includes action information corresponding to a first action and condition information for executing the first action in the first policy; and triggering, by the policy function network element, a target network element indicated by the action information to execute the first action in the first policy.

In the foregoing embodiment of this application, the policy function network element may determine the first policy in the at least one policy based on the first policy identifier. The first policy includes the action information and the condition information for executing the first action in the first policy. The policy function network element may trigger, according to the first policy, the target network element to execute the first action in the first policy, to implement collaboration of a plurality of network elements among the policy function network element, the modeling function network element, and the prediction function network element. Precise policy control may be implemented with reference to an ML technology and based on different network statuses.

In a possible implementation of the second aspect, the method further includes: sending, by the policy function network element, the condition information to a communications network element based on the condition information, to query whether the condition information is satisfied; or sending, by the policy function network element, the condition information to the communications network element to subscribe to a notification: When the condition information is satisfied, the communications network element notifies the policy function network element. The communications network element includes at least one of the following network elements: a network element NE, an operations support system OSS, or the modeling function network element. In the embodiments of this application, the policy function network element may determine, by using the communications network element, whether the condition information corresponding to the first action is satisfied, and then determine, based on whether the condition information is satisfied, whether to trigger the target network element to execute the first action, to control the target network element based on the condition information in the policy, and control the target network element when a condition needs to be queried. When the policy function network element subscribes to, from the communications network element, whether the condition information is satisfied, the communications network element may query in real time whether the condition information is satisfied. When finding that the condition information is satisfied, the communications network element may actively notify the policy function network element. The policy function network element may directly determine, based on the active notification of the communications network element, whether the first action in the first policy may be executed. The policy function network element may not need to perform real-time query. This improves execution efficiency of the action in the policy.

In a possible implementation of the second aspect, the triggering, by the policy function network element, a target network element indicated by the action information to execute the first action in the first policy includes: when the condition information is satisfied, triggering, by the policy function network element, the target network element indicated by the action information to execute the first action in the first policy. In the embodiments of this application, the policy function network element triggers the target network element to execute the first action only when the condition information is satisfied, to control the target network element based on the condition information in the policy, and control the target network element when a condition needs to be queried.

In a possible implementation of the first aspect or the second aspect, the triggering, by the policy function network element, a target network element indicated by the action information to execute the first action in the first policy includes: triggering, by the policy function network element according to an order of execution corresponding to the first policy, the target network element to execute the first action in the first policy. When actions in a plurality of policies may be executed, the prediction function network element further sends an order of execution of the policies to the policy function network element. In this case, the policy function network element may receive the order of execution of the plurality of policies from the prediction function network element. The policy function network element triggers, according to the order of execution corresponding to the first policy, the target network element to execute the first action in the first policy. When one model triggers a plurality of policies, in addition to the policies, an order of execution of the policies is carried when the model is delivered, to ensure that actions in the policies are executed in order.

In a possible implementation of the first aspect or the second aspect, the triggering, by the policy function network element, a target network element indicated by the action information to execute the first action in the first policy includes: determining, by the policy function network element based on a priority identifier corresponding to the first model, that a priority of the first model is a highest priority; and triggering, by the policy function network element, the target network element indicated by the first action corresponding to the first model with the highest priority to execute the first action in the first policy. A plurality of models may be installed in the prediction function network element, and the models correspond to different priority identifiers, to identify priorities of different models. Each model corresponds to a prediction result, and the prediction function network element sends the prediction results of the plurality of models to the policy function network element. The policy function network element determines, based on the priority identifier corresponding to the first model, that the priority of the first model is the highest priority, and the policy function network element triggers the target network element indicated by the first action corresponding to the first model with the highest priority to execute the first action in the first policy. For a model without the highest priority, the policy function network element may not execute a corresponding action. When a plurality of models trigger a same policy, different models use a series of common policy-driven methods to reduce policy redundancy and orchestration complexity.

In a possible implementation of the first aspect or the second aspect, the method further includes: receiving, by the policy function network element, policy management indication information from the modeling function network element, where the policy management indication information includes a first to-be-managed policy identifier and a first management operation, or the policy management indication information includes a second to-be-managed policy identifier, a second management operation, and a to-be-managed policy, where the first management operation includes at least one of the following operations: a policy deletion operation, a policy activation operation, a policy deactivation operation, or a policy query operation; and the second management operation includes a policy installation operation and/or a policy update operation, and the to-be-managed policy includes an event, condition information, and action information that are corresponding to the second to-be-managed policy identifier. The modeling function network element may further indicate the policy function network element to update the policy. For different types of policies, the modeling function network element may deliver different policy management indication information, so that the policy function network element may manage the policies according to the policy management indication information, to dynamically update the policies.

In a possible implementation of the second aspect, the method further includes: receiving, by the policy function network element, a prediction result of the first model from the prediction function network element; and that the policy function network element determines the first action in the first policy includes: the policy function network element determines the first action that is in the first policy and that corresponds to the prediction result. An output of the first model is the prediction result. The first policy includes a policy identifier, an event, condition information, and action information. The event may be null or non-null. When the event in the first policy is null, the policy function network element may not need to perform matching between the prediction result of the first model and the event, and the policy function network element may determine the first action based on the first policy. When the event in the first policy is non-null, the policy function network element may perform matching between the prediction result of the first model and the event in the first policy, to determine the first action that is in the first policy and that corresponds to the prediction result.

According to a third aspect, an embodiment of this application provides a policy-driven method, including: training, by a modeling function network element, an initial model based on training sample data provided by a data service function network element, to obtain a trained first model; sending, by the modeling function network element, to a prediction function network element, a model identifier of the first model and a first policy identifier triggered by the first model, where the first policy identifier is used to identify a first policy; and sending, by the modeling function network element, at least one policy to a policy function network element, where each of the at least one policy includes a policy identifier, an event, condition information, and action information, and the at least one policy is used to determine a first action in the first policy.

In the foregoing embodiment of this application, the modeling function network element may create the first model, and send the model identifier of the first model and the first policy identifier triggered by the first model to the prediction function network element, so that the prediction function network element can install the first model. The modeling function network element further sends the at least one policy to the policy function network element, so that the policy function network element can install the at least one policy, to implement collaboration of a plurality of network elements among the policy function network element, the modeling function network element, and the prediction function network element. Precise policy control may be implemented with reference to an ML technology and based on different network statuses.

In a possible implementation of the third aspect, the method further includes: when the first model triggers a plurality of policies, sending, by the modeling function network element, an order of execution of the plurality of policies to the prediction function network element. The modeling function network element may send order of execution of the plurality of policies to the prediction function network element. Then, the policy function network element receives the order of execution from the prediction function network element, and triggers, according to the order of execution corresponding to the first policy, the target network element to execute the first action in the first policy. When one model triggers a plurality of policies, in addition to the policies, an order of execution of the policies is carried when the model is delivered, to ensure that actions in the policies are executed in order.

In a possible implementation of the third aspect, the method further includes: sending, by the modeling function network element to the prediction function network element, a priority identifier corresponding to the first model. A plurality of models may be installed in the prediction function network element, and the models correspond to different priority identifiers, to identify priorities of different models. When a plurality of models trigger a same policy, different models use a series of common policy-driven methods to reduce policy redundancy and orchestration complexity.

In a possible implementation of the third aspect, the method further includes: sending, by the modeling function network element, policy management indication information to the policy function network element, where the policy management indication information includes a first to-be-managed policy identifier and a first management operation, or the policy management indication information includes a second to-be-managed policy identifier, a second management operation, and a to-be-managed policy, where the first management operation includes at least one of the following operations: a policy deletion operation, a policy activation operation, a policy deactivation operation, or a policy query operation; and the second management operation includes a policy installation operation and/or a policy update operation, and the to-be-managed policy includes an event, condition information, and action information that are corresponding to the second to-be-managed policy identifier. The modeling function network element may further indicate the policy function network element to update the policy. For different types of policies, the modeling function network element may deliver different policy management indication information, so that the policy function network element may manage the policies according to the policy management indication information, to dynamically update the policies.

In a possible implementation of the third aspect, the method further includes: receiving, by the modeling function network element, a query request or subscription request for the condition information from the policy function network element; and querying, by the modeling function network element based on the query request, whether the condition information is satisfied to generate a query result, and notifying the policy function network element of the query result; or querying, by the modeling function network element based on the subscription request, whether the condition information is satisfied; and when the condition information is satisfied, notifying, by the modeling function network element, the policy function network element. The policy function network element may query, through interaction with the modeling function network element, whether a condition is satisfied. The policy function network element triggers the target network element to execute the first action only when the condition information is satisfied, to control the target network element based on the condition information in the policy, and control the target network element when a condition needs to be queried.

According to a fourth aspect, an embodiment of this application provides a policy-driven method, including: sending, by a prediction function network element, a first policy identifier triggered by a first model to a policy function network element, where the first policy identifier is used to identify a first policy, and the first policy includes action information corresponding to a first action; obtaining, by the prediction function network element, an execution result of the first action; and using, by the prediction function network element, the execution result of the first action as input data of a second model, and performing prediction by using the second model.

In the foregoing embodiment of this application, the prediction function network element may predict the first model. The prediction function network element may further input the execution result of the first action into the second model, so that the first model and the second model may be jointly executed, and a plurality of models may not need to be coupled together. Therefore, a single model can be reused. This improves model reuse efficiency. In the embodiments of this application, collaboration of a plurality of network elements may be implemented between the policy function network element and the prediction function network element. With reference to an ML technology, abundant network information may be used to provide a policy that is most suitable for a current network status, and data information in a wireless network may be converted into a policy by using a plurality of models.

In a possible implementation of the fourth aspect, the obtaining, by the prediction function network element, an execution result of the first action includes: receiving, by the prediction function network element, the execution result of the first action from the policy function network element; or receiving, by the prediction function network element, the execution result of the first action from the data service function network element. The prediction function network element may receive the execution result of the first action from the policy function network element or the data service function network element. In the embodiments of this application, the prediction function network element may determine, based on a scenario, how to obtain the execution result of the first action.

In a possible implementation of the fourth aspect, the method further includes: sending, by the prediction function network element, a prediction result of the first model to the policy function network element, where the prediction result is used to determine the first action in the first policy. The prediction function network element performs prediction by using the first model, and obtains the prediction result. The first policy includes a policy identifier, an event, condition information, and action information. The event may be null or non-null. When the event in the first policy is null, the policy function network element may not need to perform matching between the prediction result of the first model and the event, and the policy function network element may determine the first action based on the first policy. When the event in the first policy is non-null, the policy function network element may perform matching between the prediction result of the first model and the event in the first policy, to determine the first action that is in the first policy and that corresponds to the prediction result.

According to a fifth aspect, an embodiment of this application provides a policy-driven method, including: sending, by a data service function network element, training sample data to a modeling function network element, where the training sample data is used for training of a first model; sending, by the data service function network element, input data of the first model to a prediction function network element; receiving, by the data service function network element, an execution result of a first action from a policy function network element, where the execution result of the first action is associated with the input data of the first model; and sending, by the data service function network element, the execution result of the first action to the prediction function network element, where the execution result of the first action is used as input data of a second model.

In the foregoing embodiment of this application, the data service function network element may provide data for the modeling function network element and the prediction function network element separately. The execution result of the first action sent by the data service function network element to the prediction function network element may be used as the input data of the second model, so that the first model and the second model may be jointly executed, and a plurality of models may not need to be coupled together. Therefore, a single model can be reused. This improves model reuse efficiency. Collaboration operation of a plurality of network elements may further be implemented among the data service function network element, the policy function network element, and the prediction function network element. With reference to an ML technology, abundant network information may be used to provide a policy that is most suitable for a current network status, and data information in a wireless network may be converted into a policy by using a plurality of models.

In a possible implementation of the fifth aspect, the receiving, by the data service function network element, an execution result of a first action from a policy function network element includes: receiving, by the data service function network element, the execution result of the first action from the policy function network element via an interface between the policy function network element and the data service function network element. The interface is configured between the policy function network element and the data service function network element. The policy function network element sends the execution result of the first action to the data service function network element via the interface. A format and communication manner of a transmission protocol are not limited for the interface configured between the data service function network element and the policy function network element. Data may be efficiently transmitted between the policy function network element and the data service function network element via the interface between the policy function network element and the data service function network element, and a plurality of models are decoupled.

According to a sixth aspect, an embodiment of this application provides a policy-driven apparatus. The apparatus may be configured to perform an operation according to any one of the first aspect to the fifth aspect and the possible implementations of the first aspect to the fifth aspect. For example, the apparatus may perform an operation of the policy function network element according to any one of the first aspect or the second aspect or the possible implementations of the first aspect or the second aspect, or perform an operation of the modeling function network element according to any one of the third aspect or the possible implementations of the third aspect, perform an operation of the prediction function network element according to any one of the fourth aspect or the possible implementations of the fourth aspect, or perform an operation of the data service function network element according to any one of the fifth aspect or the possible implementations of the fifth aspect. The apparatus may include modules or units configured to perform operations according to any one of the first aspect to the fifth aspect or the possible implementations of the first aspect to the fifth aspect.

According to a seventh aspect, an embodiment of this application provides a policy function network element. The policy function network element includes a processor and a memory. The processor and the memory communicate with each other. The memory is configured to store an instruction. The processor is configured to execute the instruction in the memory, to perform the method according to the first aspect or the second aspect.

According to an eighth aspect, an embodiment of this application provides a modeling function network element. The modeling function network element includes a processor and a memory. The processor and the memory communicate with each other. The memory is configured to store an instruction. The processor is configured to execute the instruction in the memory, to perform the method according to the third aspect.

According to a ninth aspect, an embodiment of this application provides a prediction function network element. The prediction function network element includes a processor and a memory. The processor and the memory communicate with each other. The memory is configured to store an instruction. The processor is configured to execute the instruction in the memory, to perform the method according to the fourth aspect.

According to a tenth aspect, an embodiment of this application provides a data service function network element. The data service function network element includes a processor and a memory. The processor and the memory communicate with each other. The memory is configured to store an instruction. The processor is configured to execute the instruction in the memory, to perform the method according to the fifth aspect.

According to an eleventh aspect, an embodiment of this application provides a computer-readable storage medium. The computer-readable storage medium stores an instruction, and when the instruction is run on a computer, the computer is enabled to perform the methods in the foregoing aspects.

According to twelfth aspect, an embodiment of this application provides a computer program product including an instruction. When the computer program product runs on a computer, the computer is enabled to perform the methods in the foregoing aspects.

According to a thirteenth aspect, an embodiment of this application provides a policy-driven apparatus. The policy-driven apparatus includes a processor and a memory. The memory is configured to store an instruction. The processor is configured to execute the instruction in the memory, to enable the policy-driven apparatus to perform the method according to any one of the first aspect to the fifth aspect. For example, the apparatus may perform an operation of the policy function network element according to any one of the first aspect or the second aspect or the possible implementations of the first aspect or the second aspect, or perform an operation of the modeling function network element according to any one of the third aspect or the possible implementations of the third aspect, perform an operation of the prediction function network element according to any one of the fourth aspect or the possible implementations of the fourth aspect, or perform an operation of the data service function network element according to any one of the fifth aspect or the possible implementations of the fifth aspect.

According to a fourteenth aspect, this application provides a chip system. The chip system includes a processor, configured to support a policy function network element, a modeling function network element, a prediction function network element, and the data service function network element in implementing functions in the foregoing aspects, for example, sending or processing data and/or information in the foregoing methods. In a possible design, the chip system further includes a memory. The memory is configured to store program instructions and data that are necessary for the policy function network element, the modeling function network element, the prediction function network element, and the data service function network element. The chip system may include a chip, or may include a chip and another discrete component.

According to a fifteenth aspect, an embodiment of this application provides a policy-driven system. The policy-driven system includes a policy function network element, a modeling function network element, a prediction function network element, and a data service function network element. Functions and components of the network elements are separately described in the foregoing aspects.

DESCRIPTION OF EMBODIMENTS

Figure 1:
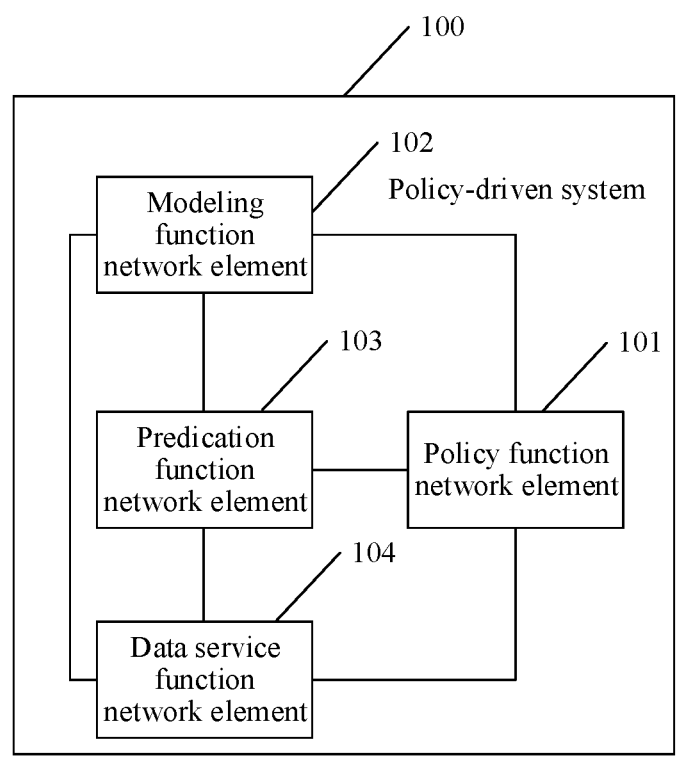
FIG. 1 is a schematic structural diagram of composition of a policy-driven system according to an embodiment of this application.

Embodiments of this application provide a policy-driven method and an apparatus, to convert data information in a wireless network into a policy by using a machine learning technology through collaboration of a plurality of function network elements.

The following describes the embodiments of this application with reference to the accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The policy-driven method provided in the embodiments of this application may be applied to a machine learning model in a wireless network. Machine learning may be applied to a wireless network.

Main steps of machine learning approximately include data collection, preprocessing, feature engineering, training, prediction, and the like.

The data collection means that a data collection device obtains various types of raw data from an object generating a data source. The collected data may be stored in a database or a memory of the data collection device, and is used for training or prediction.

The preprocessing means that data operations such as simple structuring, cleaning, deduplication, and denoising are performed on the raw data.

The feature engineering is an important process of the machine learning, is also an operation on data, and may be considered as further processing of the data. Typical operations include training data feature extraction, correlation analysis, and the like. These operations may be completed with assistance from some complex algorithms.

In the machine learning, training is a part used to generate a prediction model. After preparing data, an algorithm user selects an appropriate algorithm and feature (where if supervised learning is used, the user also needs to select appropriate label data), and enters the data into the algorithm. Then, a computer executes the training algorithm. For example, algorithms used in the embodiments of this application may include regression, a decision tree, a support vector machine (Support Vector Machine, SVM), a neural network, a Bayesian classifier, and the like. Each type of algorithm may also include a plurality of derived algorithm types. After a single training algorithm is trained, a machine learning model is generated.

After the machine learning model is trained, prediction may be performed by using the machine learning model. For example, an output value corresponding to the model may be predicted by inputting new sample data into the trained model.

Figure 2:
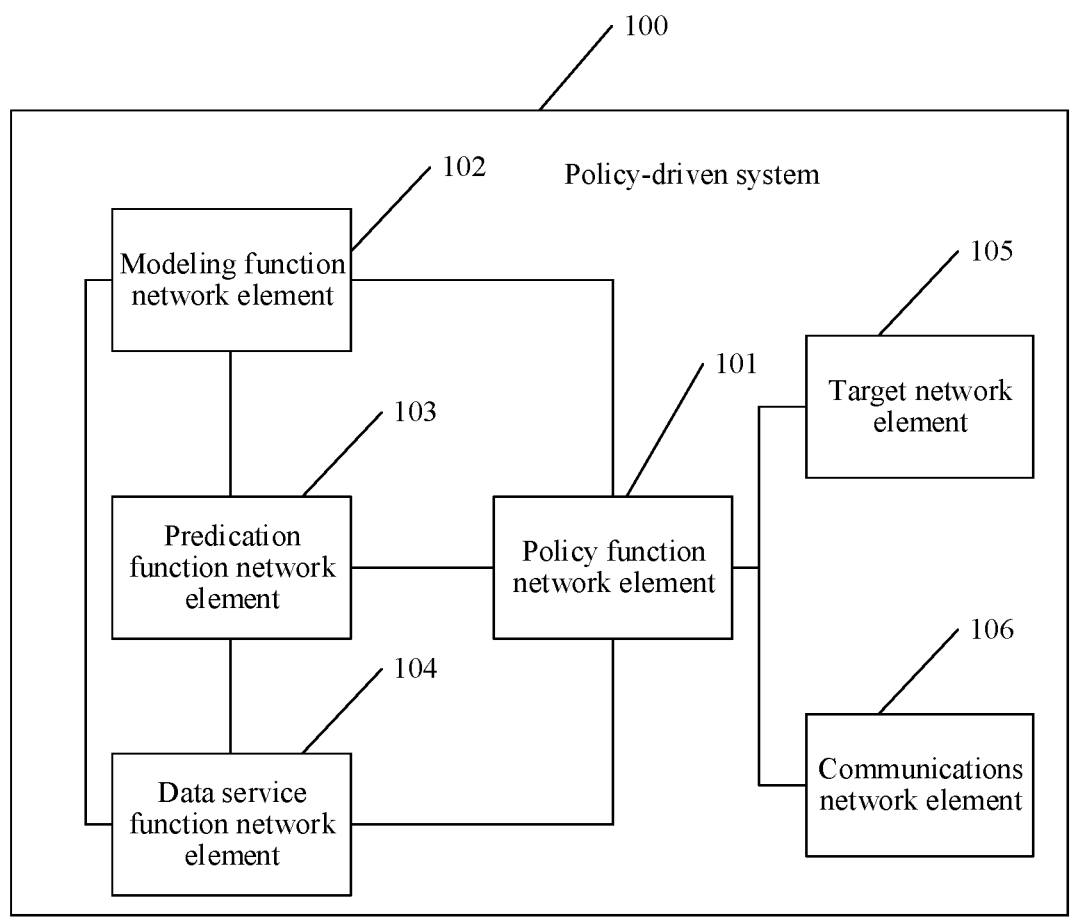
FIG. 2 is a schematic structural diagram of composition of another policy-driven system according to an embodiment of this application.

As shown in FIG. 1 and FIG. 2, FIG. 1 is a schematic structural diagram of composition of a policy-driven system according to an embodiment of this application. FIG. 2 is a schematic structural diagram of composition of another policy-driven system according to an embodiment of this application. An embodiment of this application may provide a policy-driven system 100. The policy-driven system 100 includes a policy function network element 101, a modeling function network element 102, a prediction function network element 103, and a data service function (Data Service Function, DSF) network element 104. The policy function network element 101 may separately communicate with the modeling function network element 102, the prediction function network element 103, and the data service function network element 104. The prediction function network element 103 may separately communicate with the policy function network element 101, the modeling function network element 102, and the data service function network element 104. The modeling function network element 102 may separately communicate with the policy function network element 101, the prediction function network element 103, and the data service function network element 104. The data service function network element 104 may separately communicate with the policy function network element 101, the modeling function network element 102, and the prediction function network element 103.

The modeling function network element 102 may implement functions such as model training and delivery, and policy delivery. A model created by the modeling function network element 102 and a plurality of delivered policies have different implementations in different wireless network scenarios. For example, the modeling function network element 102 may be an analyzing and modeling function (Analyzing and Modeling Function, AMF) network element. For example, the AMF network element may be used in a 5G system or another communications system. The modeling function network element 102 has an analyzing and modeling function, and may provide network big data analysis, mining, and training functions of various learning models.

The prediction function network element 103 may implement model installation and prediction functions. The model created by the modeling function network element 102 may be installed on the prediction function network element 103. The prediction function network element 103 may perform model prediction by using input data provided by the data service function network element 104, and transmit a prediction result to the policy function network element 101. For example, the prediction function network element 103 may be a model execution function (Model Execution Function, MEF) network element. The MEF network element may be used in a 5G system or another communications system. The prediction function network element 103 has a model execution function, and may execute a trained model. The model is used to predict network data.

Based on the prediction result of the model, the policy function network element 101 triggers a corresponding policy or executes an action corresponding to the policy. For example, the policy function network element 101 may be an adaptive policy function (Adaptive Policy Function, APF) network element. For example, the APF network element may be used in a 5G system or another communications system. The policy function network element 101 has an intelligent collaboration function, and is configured to trigger a corresponding policy based on an analysis result or a model execution result, to change a network status. For example, through adjustment of the network status, parameter optimization, traffic engineering, and resource scheduling may be performed.

The data service function network element 104 may implement a data integration function. The data service function network element 104 may provide data for the modeling function network element 102 and the prediction function network element 103, and store an execution result of each network element. A dedicated interface may be configured between the data service function network element 104 and the policy function network element 101. The data service function network element 104 may receive, via the interface, the execution result generated by the policy function network element 101 after the policy function network element 101 executes the action corresponding to the policy. For the interface configured between the data service function network element 104 and the policy function network element 101, a format and a communication manner of a transmission protocol are not limited. Data may be efficiently transmitted from the policy function network element 101 to the data service function network element 104 via the interface. The data service function network element may be used in a 5G system or another communications system. The data service function network element has a data service function, and may collect and preprocess data, and provide data and a processing result for different network elements.

The policy function network element 101, the modeling function network element 102, the prediction function network element 103, and the data service function network element 104 may be logical network elements. Optionally, the policy function network element 101, the modeling function network element 102, the prediction function network element 103, and the data service function network element 104 may be integrated into one device. Alternatively, the modeling function network element 102, the prediction function network element 103, and the data service function network element 104 may be integrated into one device. This will be further described with reference to FIG. 13 below.

As shown in FIG. 2, the policy-driven system 100 may further include a target network element 105. The policy function network element 101 may further communicate with the target network element 105, and the policy function network element 101 may trigger the target network element 105 to execute a corresponding action. When there are different models and different action outputs, the target network element 105 may be implemented in a plurality of manners. For example, the target network element is a specific network element that is triggered by the policy function network element to execute the action. The target network element may be at least one of the following network elements: an operations support system (Operations Support System, OSS) or a network element (Network Element, NE). The network element may include a hardware device and software running on the hardware device. A network element usually has at least one main control board for managing and monitoring the entire network element. Host software is running on the main control board. For example, in an evolved packet core (Evolved Packet Core, EPC) of a 4th generation (4th-Generation, 4G) mobile communications technology system, the network element may be a mobility management entity (Mobility Management Entity, MME), a serving gateway (Serving GateWay, SGW), a packet data network (Packet Data Network, PDN) gateway (PDN GateWay, PGW), a home subscriber server (Home Subscriber Server, HSS), a policy and charging rules function (Policy and Charging Rules Function, PCRF) unit, or the like. Alternatively, the network element may be an access and mobility management function (Access and Mobility Management Function) network element, a session management function (Session Management Function, SMF) network element, a policy control function (Policy Control Function, PCF) network element, or the like in the 5G system. A specific implementation of the network element is not limited herein.

As shown in FIG. 2, the policy-driven system 100 may further include a communications network element 106. The policy function network element 101 may further communicate with the communications network element 106, to query whether condition information included in a policy is satisfied. The communications network element 106 may include at least one of the following network elements: an NE, an OSS, or the modeling function network element. The condition information included in the policy is used to determine whether an action corresponding to action information included in the policy is executed. For example, the policy function network element 101 determines a first policy based on a first policy identifier, and parses out condition information included in the policy from the first policy. Then, the policy function network element 101 may send the condition information to the communications network element 106, to query whether the condition information is satisfied. The policy function network element 101 may receive a query result sent by the communications network element 106, and determine, based on the query result, whether the condition information queried by the policy function network element 101 is satisfied. The action corresponding to the action information included in the policy is executed only when the condition information is satisfied.

It should be noted that the policy function network element 101 sends a query request to the communications network element 106, but the policy function network element 101 may alternatively determine, in another manner, whether the condition information is satisfied. For example, the policy function network element 101 may send the condition information to the communications network element 106 to subscribe to a notification: When the condition information is satisfied, the communications network element 106 notifies the policy function network element 101.

Figure 3:
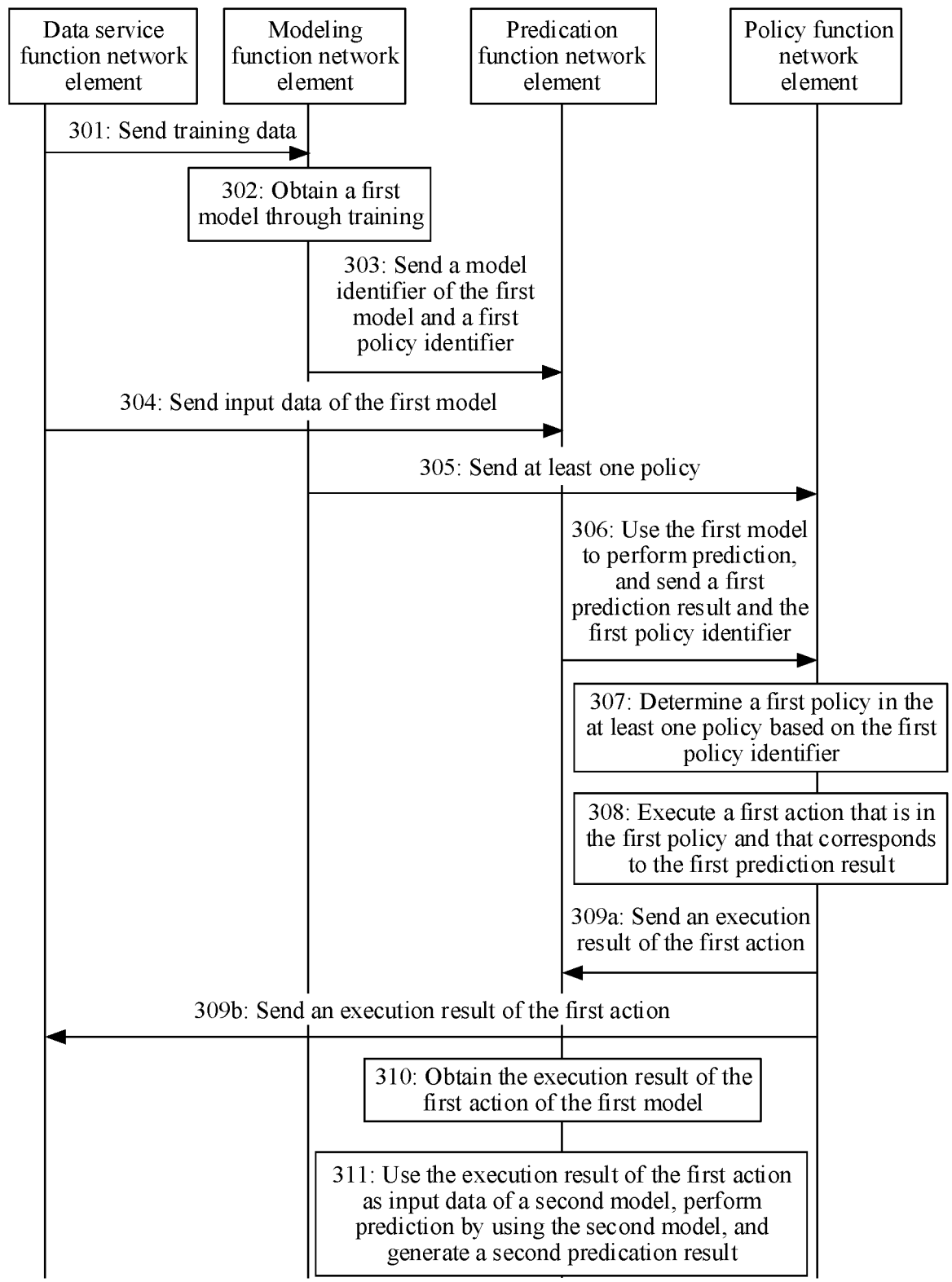
FIG. 3 is a schematic flowchart of interaction between a plurality of network elements in a policy-driven system according to an embodiment of this application.

The following describes an interaction process between components of a policy-driven system by using examples. FIG. 3 is a schematic flowchart of interaction between a plurality of network elements in a policy-driven system according to an embodiment of this application. For example, a policy function network element, a modeling function network element, a prediction function network element, and a data service function network element in FIG. 3 may be respectively the policy function network element 101, the modeling function network element 102, the prediction function network element 103, and the data service function network element 104 in FIG. 2. As shown in FIG. 3, the method includes the following steps.

Before step 301 is performed, the modeling function network element may obtain data from the data service function network element in advance. The data is determined during algorithm design, to create an initial model (not shown in the figure).

Step 301: The data service function network element sends training data to the modeling function network element.

For example, an interface is configured between the data service function network element and the modeling function network element, and the data service function network element may provide the training data for the modeling function network element via the interface.

Step 302: The modeling function network element trains the initial model based on the training data provided by the data service function network element, to obtain a trained first model.

For example, the modeling function network element may train the initial model by using the training data as a sample, to obtain the trained model. For ease of description, the trained model is referred to as a first model. The modeling function network element is not limited, and may further obtain a second model through training.

Step 303: The modeling function network element sends a model identifier of the first model and a first policy identifier to the prediction function network element.

For example, after obtaining the first model through training, the modeling function network element determines the model identifier of the first model and the policy identifier triggered by the first model. For ease of description, the policy identifier triggered by the first model is referred to as a first policy identifier.

For example, an interface is configured between the modeling function network element and the prediction function network element, and the model identifier of the first model and the first policy identifier may be transmitted via the interface between the modeling function network element and the prediction function network element.

Step 304: The data service function network element sends input data of the first model to the prediction function network element.

The data service function network element may provide the input data for the prediction function network element, so that the prediction function network element may use the input data to predict the first model, and generate a prediction result of the first model.

Step 305: The modeling function network element sends at least one policy to the policy function network element. Each of the at least one policy includes a policy identifier, an event, and action information.

The at least one policy identifier is used to distinguish between different policies, and a policy may be selected based on a policy identifier. The at least one policy sent by the modeling function network element to the policy function network element may be identified by using a corresponding policy identifier. The prediction function network element may generate a prediction result by performing prediction by using a model, and an event in a policy corresponds to the prediction result of the model. The event may be null or non-null. When the event in the policy is null, the policy function network element may not need to perform matching between the prediction result of the model and the event, and the policy function network element may determine an action based on the policy. When the event in the policy is non-null, the policy function network element may perform matching between the prediction result of the model and the event in the policy, to determine action information that is in the policy and that corresponds to the prediction result. The action information includes an action that may be executed and a network element that executes the action. For example, the network element that executes the action may be the policy function network element, or may be another network element. This is not limited herein.

It should be noted that a sequence of performing steps 303, 304, and 305 is not limited.

Optionally, each policy may further include condition information. The condition information is used to determine whether an action corresponding to the action information included in the policy is executed. For example, the policy function network element determines a policy based on the first policy identifier, and parses out condition information included in the policy from the policy. Then, the policy function network element may send the condition information to a communications network element, to query whether the condition information is satisfied. Alternatively, the policy function network element may send the condition information to the communications network element to subscribe to a notification: When the condition information is satisfied, the communications network element notifies the policy function network element. The communications network element includes at least one of the following network elements: an NE, an OSS, or the modeling function network element. The policy function network element may receive a query result sent by the communications network element, and determine, based on the query result, whether the condition information queried by the policy function network element is satisfied. The action corresponding to the action information included in the policy is executed only when the condition information is satisfied.

For example, an interface is configured between the modeling function network element and the policy function network element, and the policy function network element may obtain the at least one policy from the modeling function network element via the interface.

Step 306: The prediction function network element predicts the first model by using the input data of the first model, generates a first prediction result, and sends the first prediction result and the first policy identifier to the policy function network element.

For example, the prediction function network element obtains the model identifier of the first model and the first policy identifier from the modeling function network element, and may install the first model based on the model identifier of the first model and the model information of the first model. The model information of the first model is sent by the modeling function network element to the prediction function network element. The prediction function network element obtains the input data of the first model from the data service function network element, and then performs prediction by using the input data and the first model, to generate the first prediction result. A prediction result is related to a specific model and input data of the model. For example, the prediction result may be a target inter-frequency physical cell identifier (Physical Cell Identifier, PCI) in an inter-frequency handover scenario.

After the prediction is completed, the prediction function network element may send the first prediction result and the first policy identifier via an interface between the prediction function network element and the policy function network element.

It should be noted that a sequence of performing steps 305 and 306 is not limited.

Step 307: The policy function network element determines a first policy in the at least one policy based on the first policy identifier, where the first policy includes action information corresponding to a first action.

The policy function network element may receive the first prediction result and the first policy identifier from the prediction function network element, and determine the first policy based on the first policy identifier. Information about the first policy includes the policy identifier, an event, and action information. The event may be null or non-null. When the event in the first policy is null, the policy function network element may not need to perform matching between the first prediction result and the event, and the policy function network element may determine the first action based on the first policy. When the event in the first policy is non-null, the policy function network element may perform matching between the first prediction result and the event in the first policy, to determine the action that is in the first policy and that corresponds to the prediction result. For example, when the determined first policy includes only one piece of action information, the policy function network element may determine the corresponding action information based on the policy identifier. When the determined first policy includes two or more types of different action information, the policy function network element may perform matching between the first prediction result and the event in the first policy, and determine, based on an event selected through matching, action information corresponding to the first prediction result.

Optionally, when the first policy further includes condition information, the policy function network element may determine, based on the first prediction result, whether the condition information is satisfied. For example, the policy function network element may determine, by subscribing to a notification from or sending a query request to the communications network element, whether the condition information is satisfied; and when the condition information is satisfied, trigger execution of subsequent step 308.

Step 308: The policy function network element executes the first action that is in the first policy and that corresponds to the first prediction result.

After the policy function network element determines the first policy, the policy function network element obtains, based on the first policy and the first prediction result, the first action included in the first policy, and then may execute the first action corresponding to the first policy. Different policies may indicate different actions. This is not limited herein.

Step 309a: The policy function network element sends an execution result of the first action to the prediction function network element.

Step 309b: The policy function network element sends an execution result of the first action to the data service function network element.

The policy function network element generates the execution result after executing the first action in the first policy, and the policy function network element sends the execution result of the first action to the prediction function network element or the data service function network element. In other words, any one of steps 309a and 309b may be performed. This specifically depends on an application scenario. The first action performed by the policy function network element may be implemented in a plurality of manners in different scenarios. For example, the first action performed by the policy function network element may include: converting the prediction result of the model into a physical meaning corresponding to the prediction result, and sending the physical meaning to the data service function network element or the prediction function network element. For example, the first model is a TCP version identification model, the policy identifier in the first policy is 1000, the event in the first policy is null, the condition information in the first policy is null, and the action information in the first policy is: If the prediction result is 1, that a TCP version is NewReno (NewReno) is sent to the data service function network element. The execution result of performing the first action by the policy function network element is that the TCP version selected through matching based on the prediction result is NewReno. The policy function network element sends the execution result to the data service function network element, and the execution result may be used as input data of another model. It should be noted that, an example in which the prediction result being 1 indicates that the TCP version is NewReno is used for description. A value of the prediction result is not limited, and may alternatively be 2 or 3. For example, when the prediction result is 2, it indicates that the TCP version is Cubic (CUBIC). If the prediction result is 3, the TCP version is C-TCP.

After any one of step 309*a* or step 309*b* is performed, subsequent step 310 may be performed.

Step 310: The prediction function network element obtains the execution result of the first action of the first model.

After the first action of the first model is executed by the policy function network element, the prediction function network element may receive the execution result of the first action. For example, the prediction function network element obtains the execution result of the first action from the policy function network element in step 309*a*; or after the data service function network element obtains the execution result of the first action from the policy function network element in step 309*b*, the prediction function network element obtains the execution result of the first action from the data service function network element.

Step 311: The prediction function network element uses the execution result of the first action as input data of a second model, and performs prediction by using the second model.

A plurality of models, such as the first model and the second model, are installed on the prediction function network element. The plurality of models installed on the prediction function network element are independent of each other. After executing the first action in the first policy, the policy function network element may generate the execution result of the first action. After obtaining the execution result of the first action, the prediction function network element may use the execution result of the first action as the input data of the second model, and perform prediction by using the second model. The plurality of models installed on the prediction function network element are decoupled. In the embodiments of this application, an output of a model may be used as an input of another model, so that the embodiments of this application may be applied to a scenario in which a plurality of models jointly drive parameter optimization. A plurality of models do not need to be coupled together, so that a single model can be reused, to improve model reuse efficiency. In addition, collaboration of a plurality of network elements may be implemented among the policy function network element, the modeling function network element, the prediction function network element, and the data service function network element. With reference to an ML technology, abundant network information may be used to provide a policy that is most suitable for a current network status, and data information in a wireless network may be converted into a policy by using a plurality of models.

Figure 4:
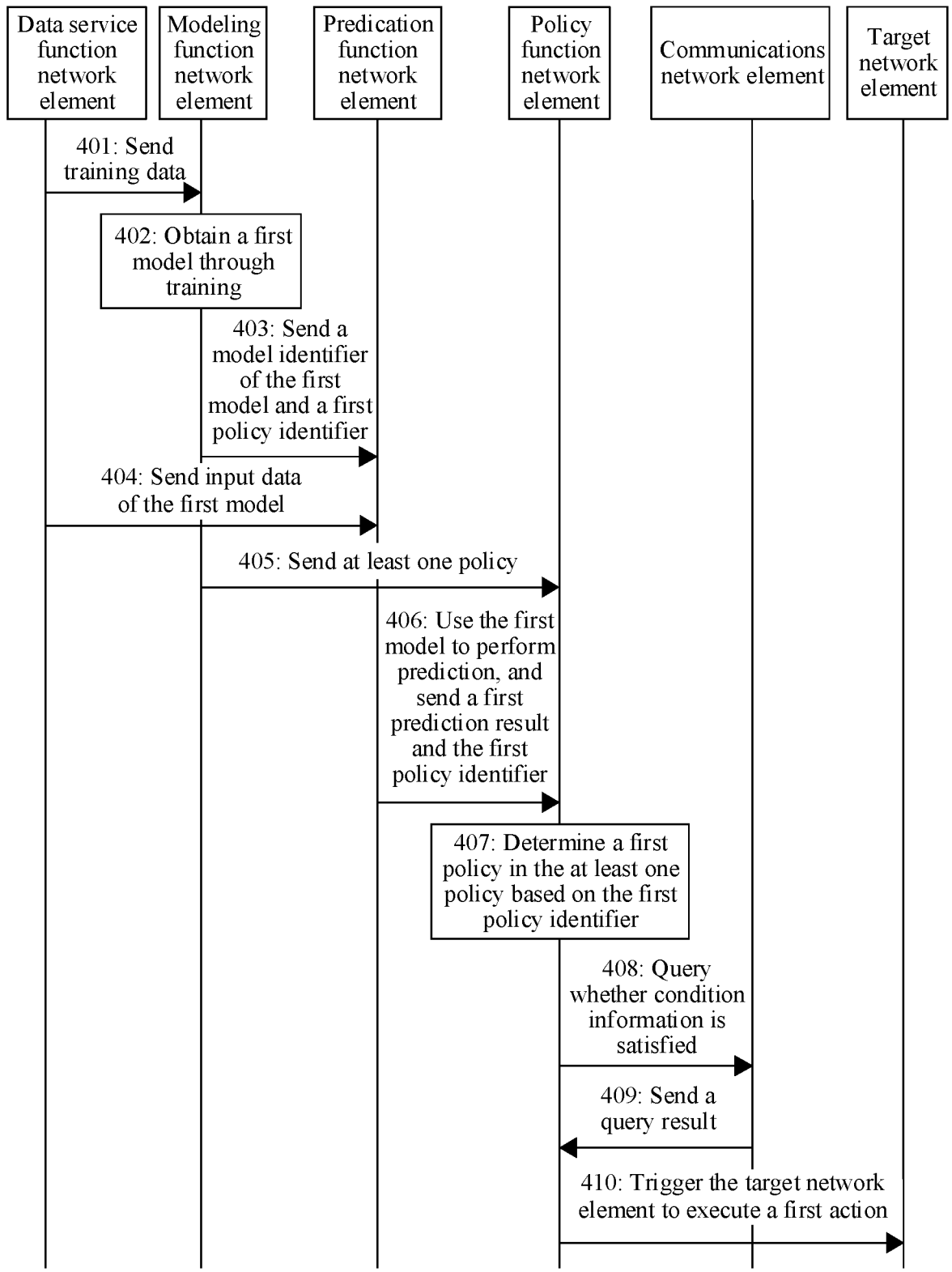
FIG. 4 is another schematic flowchart of interaction between a plurality of network elements in a policy-driven system according to an embodiment of this application.

FIG. 4 is another schematic flowchart of interaction between a plurality of network elements in a policy-driven system according to an embodiment of this application. FIG. 4 is described with reference to FIG. 3. As shown in FIG. 4, the method includes the following steps.

Step 401: A data service function network element sends training data to a modeling function network element.

Step 402: The modeling function network element trains an initial model based on the training data provided by the data service function network element, to obtain a trained first model.

Step 403: The modeling function network element sends a model identifier of the first model and a first policy identifier to a prediction function network element.

Step 404: The data service function network element sends input data of the first model to the prediction function network element.

For steps 401 to 404, refer to descriptions of examples of step 301 to step 304 in the foregoing embodiment, and details are not described herein.

Step 405: The modeling function network element sends at least one policy to a policy function network element. Each of the at least one policy includes a policy identifier, an event, action information, and condition information.

For descriptions of the policy identifier, the event, the action information, and the condition information, refer to the foregoing embodiment in FIG. 3.

It should be noted that a sequence of performing steps 403, 404, and 405 is not limited.

Step 406: The prediction function network element predicts the first model by using the input data of the first model, generates a first prediction result, and sends the first prediction result and the first policy identifier to the policy function network element.

For step 406, refer to descriptions of an example of step 306 in the foregoing embodiment, and details are not described herein.

It should be noted that a sequence of performing steps 405 and 406 is not limited.

Step 407: The policy function network element determines a first policy in the at least one policy based on the first policy identifier.

The policy function network element may receive the first prediction result and the first policy identifier from the prediction function network element, and determine the first policy based on the first policy identifier. Information about the first policy includes the policy identifier, an event, and action information. The event may be null or non-null. When the event in the first policy is null, the policy function network element does not perform matching between the first prediction result and the event, and the policy function network element may determine the first action based on the first policy. When the event in the first policy is non-null, the policy function network element may perform matching between the first prediction result and the event in the first policy, to determine the action that is in the first policy and that corresponds to the prediction result.

Step 408: The policy function network element obtains the condition information included in the first policy, and queries, from a communications network element, whether the condition information is satisfied.

Step 409: After performing query by using the condition information, the communications network element sends a query result to the policy function network element.

After the policy function network element determines the first policy in step 407, the policy function network element may further obtain the condition information included in the first policy, and the policy function network element may query, from the communications network element, whether the condition information is satisfied. The communications network element includes at least one of the following network elements: an NE, an OSS, or the modeling function network element. When the condition information is satisfied, subsequent step 410 is triggered to be performed. The condition information is used to determine whether an action corresponding to the action information included in the first policy is executed. For example, the policy function network element determines the first policy based on the first policy identifier, and parses out the condition information included in the policy from the first policy. Then, the policy function network element may send the condition information to the communications network element, to query whether the condition information is satisfied. The policy function network element may receive the query result sent by the communications network element, and determine, based on the query result, whether the condition information queried by the policy function network element is satisfied. The action corresponding to the action information included in the policy is executed only when the condition information is satisfied.

It should be noted that, in step 408, the policy function network element sends a query request to the communications network element, but the policy function network element may alternatively determine, in another manner, whether the condition information is satisfied. For example, the policy function network element may send the condition information to the communications network element to subscribe to a notification: When the condition information is satisfied, the communications network element notifies the policy function network element.

In some embodiments of this application, the first policy may include one or more pieces of condition information. When the first policy includes a plurality of pieces of condition information, the policy function network element may query, from the communications network element, whether the plurality of pieces of condition information are satisfied. The communications network element may query whether each piece of condition information is satisfied, and the communications network element may generate a query result for each piece of condition information. The query result includes whether the condition information is satisfied. The policy function network element may determine, based on the query results sent by the communications network element, condition information that is satisfied, and then perform step 410.

In some embodiments of this application, the first policy may include one or more pieces of condition information. When the first policy includes a plurality of pieces of condition information, the policy function network element may subscribe to, from the communications network element, a notification about whether the plurality of pieces of condition information are satisfied. The communications network element may query whether each piece of condition information is satisfied, and the communications network element may notify the policy function network element of condition information that is satisfied. The policy function network element may determine, based on the notification sent by the communications network element, the condition information that is satisfied, and then perform step 410.

Step 410: The policy function network element triggers a target network element to execute the first action in the first policy.

For example, after the policy function network element determines the first policy in the at least one policy based on the first policy identifier, when the determined first policy includes only one piece of action information, the policy function network element may determine the corresponding action information based on the policy identifier. When the determined first policy includes two or more types of different action information, the policy function network element may perform matching between the first prediction result and the event in the first policy, and determine, based on an event selected through matching, action information corresponding to the first prediction result.

It should be noted that, different from FIG. 3, in the scenario shown in FIG. 4, the first action is not executed by the policy function network element, and the policy function network element only needs to determine the first action.

Specific execution may be completed by the target network element indicated by the first policy. The target network element may be, for example, at least one of the following network elements: an OSS or an NE. For descriptions of the NE, refer to the descriptions in the foregoing embodiment, and details are not described herein again.

The target network element may receive the first action from the policy function network element, and then the target network element performs the first action. Different policies may indicate specific actions. For example, the target network element may be an NE or an OSS. For example, the first action performed by the NE or the OSS may be parameter modification. In the embodiments of this application, precise policy control is implemented through collaboration of a plurality of function network elements and with reference to an ML technology and based on different network statuses.

Figure 5:
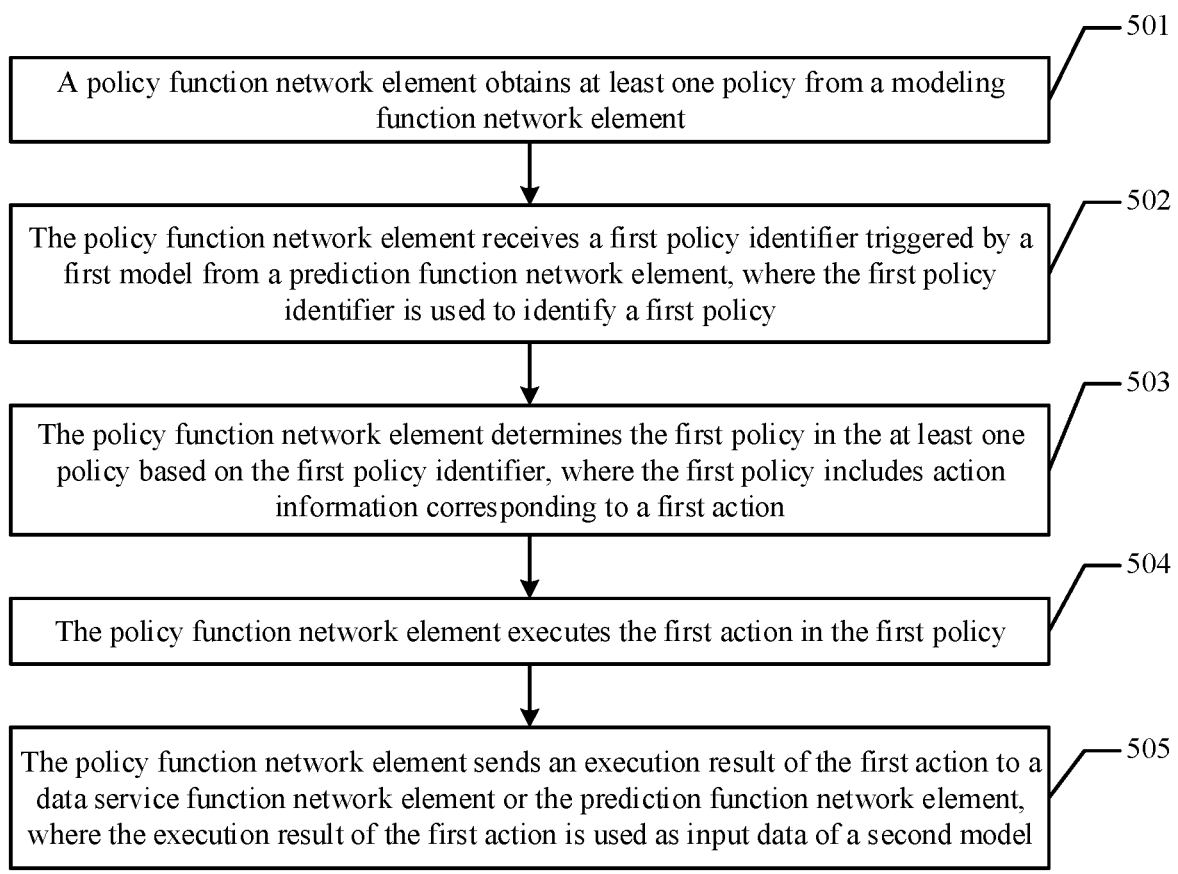
FIG. 5 is a schematic block flowchart of a policy-driven method according to an embodiment of this application.

The following describes, by using examples, a policy-driven method performed by each component of the policy-driven system. Referring to FIG. 5, descriptions are provided first from a perspective of a policy function network element. The policy function network element may be the policy function network element 101 in the embodiment shown in FIG. 1 or FIG. 2. The policy function network element can perform the steps of the policy function network element that are in FIG. 3 or FIG. 4. FIG. 5 is described with reference to FIG. 3 and FIG. 4. An embodiment of this application provides a policy-driven method, including the following steps.

501: The policy function network element obtains at least one policy from a modeling function network element.

A user may orchestrate the at least one policy, and the user imports the at least one orchestrated policy into the modeling function network element. After obtaining the at least one policy, the modeling function network element sends the at least one policy to the policy function network element. The policy function network element may obtain a plurality of policies.

In some embodiments of this application, the policy function network element may store at least one policy, and each policy may include a policy identifier, an event, and action information. Optionally, each policy may further include condition information. For descriptions of examples of the policy identifier, the event, and the action information, refer to descriptions of examples in step 305 in FIG. 3, and examples are not given one by one herein for illustration.

For a specific implementation process of step 501, refer to step 305 in FIG. 3 or step 405 in FIG. 4.

502: The policy function network element receives a first policy identifier triggered by a first model from a prediction function network element, where the first policy identifier is used to identify a first policy.

In the embodiments of this application, the prediction function network element uses input data to perform prediction by using the first model, and outputs a prediction result of the first model.

The prediction function network element sends the first policy identifier via an interface between the prediction function network element and the policy function network element. The policy function network element receives the first policy identifier from the prediction function network element, and the policy function network element may determine the first policy based on the first policy identifier.

In some embodiments of this application, the policy function network element may determine a first action based on the first policy identifier.

In some other embodiments of this application, the method may further include: The policy function network element receives the prediction result of the first model from the prediction function network element. For example, the prediction result is used to determine the first action corresponding to the first policy. After determining the first policy, the policy function network element determines, based on the prediction result, the first action indicated by the first policy.

For a specific implementation process of step 502, refer to step 306 in FIG. 3 or step 406 in FIG. 4.

503: The policy function network element determines the first policy in the at least one policy based on the first policy identifier, where the first policy includes action information corresponding to a first action.

The policy function network element obtains the at least one policy from the modeling function network element, may select the first policy in the at least one policy through matching based on the first policy identifier, and then obtain, based on the first policy selected through matching, the action information included in the first policy.

For a specific implementation process of step 503, refer to step 307 in FIG. 3 or step 407 in FIG. 4.

504: The policy function network element executes the first action in the first policy.

In the embodiments of this application, after the policy function network element selects the first policy through matching, the policy function network element may determine the first action based on the first policy. For example, the first policy includes an event and action information. The policy function network element determines the first action corresponding to the action information based on the action information included in the first policy, and performs the first action.

In some embodiments of this application, the first policy further includes condition information for executing the first action in the first policy.

If the first policy further includes condition information, the policy function network element may further determine whether the condition information included in the first policy is satisfied, and performs the first action in the first policy only when the condition information is satisfied, or does not execute the first action in the first policy when the condition information is not satisfied. The policy function network element may query, from the communications network element, whether the condition information is satisfied. The communications network element may include at least one of the following network elements: the foregoing NE, OSS, and modeling function network element.

After the policy function network element determines the first policy in step 503, the policy function network element may further obtain the condition information included in the first policy, and the policy function network element may query, from the communications network element, whether the condition information is satisfied. The communications network element includes at least one of the following network elements: an NE, an OSS, or the modeling function network element. When the condition information is satisfied, subsequent step 504 is triggered to be performed. The condition information is used to determine whether an action corresponding to the action information included in the first policy is executed. For example, the policy function network element determines the first policy based on the first policy identifier, and parses out the condition information included in the policy from the first policy. Then, the policy function network element may send the condition information to the communications network element, to query whether the condition information is satisfied. The policy function network element may receive the query result sent by the communications network element, and determine, based on the query result, whether the condition information queried by the policy function network element is satisfied. The action corresponding to the action information included in the policy is executed only when the condition information is satisfied.

It should be noted that, in the foregoing embodiment, the policy function network element sends a query request to the communications network element, but the policy function network element may alternatively determine, in another manner, whether the condition information is satisfied. For example, the policy function network element may send the condition information to the communications network element to subscribe to a notification: When the condition information is satisfied, the communications network element notifies the policy function network element.

In some embodiments of this application, the first policy may include one or more pieces of condition information. When the first policy includes a plurality of pieces of condition information, the policy function network element may query, from the communications network element, whether the plurality of pieces of condition information are satisfied. The communications network element may query whether each piece of condition information is satisfied, and the communications network element may generate a query result for each piece of condition information. The query result includes whether the condition information is satisfied. The policy function network element may determine, based on the query results sent by the communications network element, condition information that is satisfied, and then perform step 504.

In some embodiments of this application, the first policy may include one or more pieces of condition information. When the first policy includes a plurality of pieces of condition information, the policy function network element may subscribe to, from the communications network element, a notification about whether the plurality of pieces of condition information are satisfied. The communications network element may query whether each piece of condition information is satisfied, and the communications network element may notify the policy function network element of condition information that is satisfied. The policy function network element may determine, based on the notification sent by the communications network element, the condition information that is satisfied, and then perform step 504.

In some embodiments of this application, if the policy function network element receives the prediction result of the first model from the prediction function network element, in this implementation scenario, that the policy function network element executes the first action in the first policy in step 504 includes: The policy function network element executes the first action that is in the first policy and that corresponds to the prediction result.

For a specific implementation process of step 504, refer to step 308 in FIG. 3.

505: The policy function network element sends an execution result of the first action to a data service function network element or the prediction function network element, where the execution result of the first action is used as input data of a second model.

The policy function network element generates the execution result after executing the first action in the first policy, and the policy function network element sends the execution result of the first action to the prediction function network element or the data service function network element. The execution result of the first action is used as the input data of the second model. The prediction function network element uses the execution result of the first action as the input data of the second model, performs prediction by using the second model, and then outputs a prediction result of the second model.

In some of the embodiments of this application, that the policy function network element sends an execution result of the first action to a data service function network element or the prediction function network element in step 505 includes:

The policy function network element sends the execution result of the first action to the data service function network element via an interface between the policy function network element and the data service function network element.

The interface is configured between the policy function network element and the data service function network element. The policy function network element sends the execution result of the first action to the data service function network element via the interface. A format and communication manner of a transmission protocol are not limited for the interface configured between the data service function network element and the policy function network element. Data may be efficiently transmitted between the policy function network element and the data service function network element via the interface between the policy function network element and the data service function network element.

For a specific implementation process of step 505, refer to step 309a or 309b in FIG. 3.

In the foregoing embodiment of this application, the policy function network element may determine the first policy in the at least one policy based on the first policy identifier, and the policy function network element executes the first action in the first policy, and uses the execution result of the first action as the input data of the second model. In this way, the first model and the second model may be jointly executed, and a plurality of models may not need to be coupled together, so that a single model can be reused, to improve model reuse efficiency. In addition, collaboration of a plurality of network elements may be implemented among the policy function network element, the modeling function network element, the prediction function network element, and the data service function network element. With reference to an ML technology, abundant network information may be used to provide a policy that is most suitable for a current network status, and data information in a wireless network may be converted into a policy by using a plurality of models.

Figure 6:
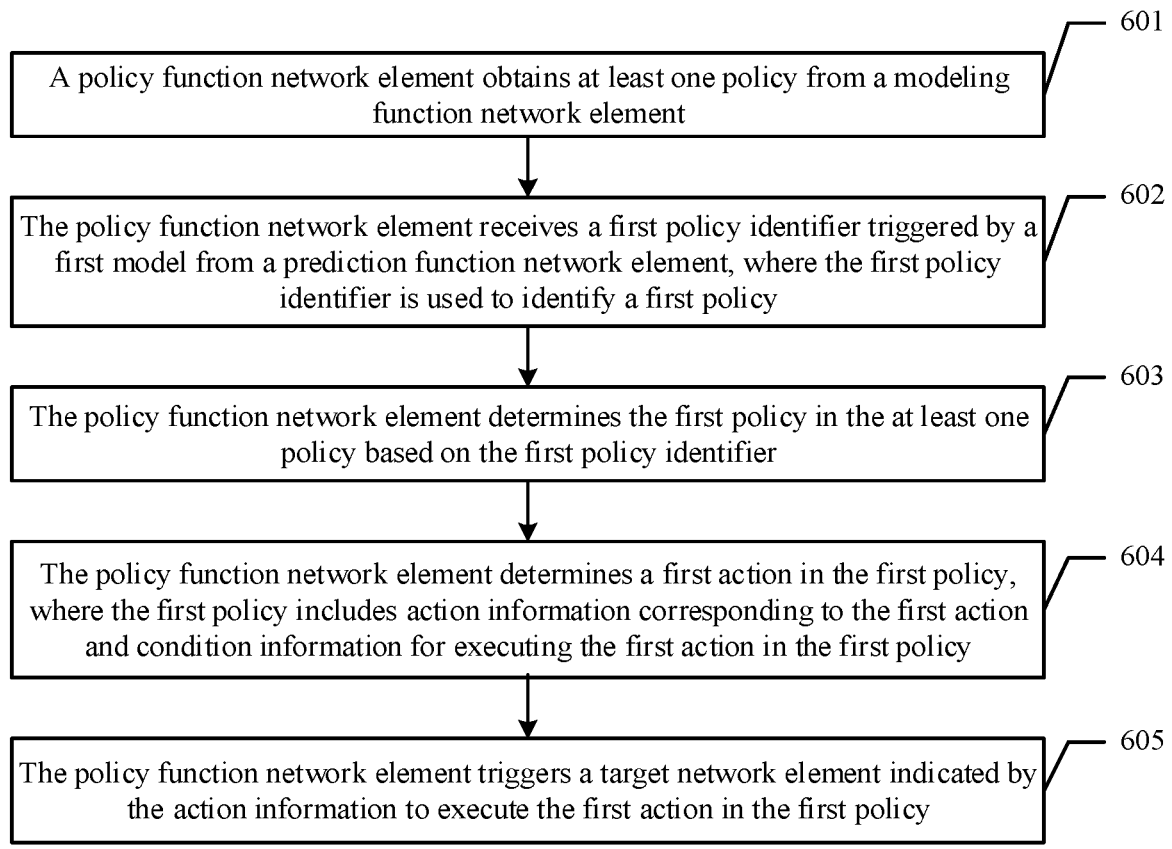
FIG. 6 is a schematic block flowchart of another policy-driven method according to an embodiment of this application.

Referring to FIG. 6, descriptions are provided from a perspective of a policy function network element. FIG. 6 is described with reference to FIG. 3 and FIG. 4. The policy function network element may be the policy function network element 101 in the embodiments shown in FIG. 1 and FIG. 2. An embodiment of this application provides another policy-driven method, including the following steps.

601: The policy function network element obtains at least one policy from a modeling function network element.

For content included in each of the at least one policy, refer to descriptions in step 305 shown in FIG. 3 in the foregoing embodiment. Details are not described herein again.

For a specific implementation process of step 601, refer to step 305 in FIG. 3 or step 405 in FIG. 4.

602: The policy function network element receives a first policy identifier triggered by a first model from a prediction function network element, where the first policy identifier is used to identify a first policy.

For a specific implementation process of step 602, refer to step 306 in FIG. 3 or step 406 in FIG. 4.

603: The policy function network element determines the first policy in the at least one policy based on the first policy identifier, where the first policy includes action information corresponding to a first action and condition information for executing the first action in the first policy.

For a specific implementation process of step 603, refer to step 307 in FIG. 3 or step 407 in FIG. 4.

Step 601 to step 603 are similar to step 501 to step 503. For details, refer to descriptions in the foregoing embodiments.

In some embodiments of this application, in addition to the foregoing steps, the policy-driven method provided in this embodiment of this application may further include the following steps:

sending, by the policy function network element, the condition information corresponding to the first action to a communications network element, to query whether the condition information is satisfied; or sending, the policy function network element, the condition information to the communications network element to subscribe to a notification: When the condition information is satisfied, the communications network element notifies the policy function network element.

The communications network element includes at least one of the following network elements: an NE, an OSS, or the modeling function network element.

The policy function network element may send a condition query request to at least one of the NE, the OSS, or the modeling function network element, and a corresponding communications network element determines whether the condition information is satisfied, and generates a query result accordingly. For example, whether the condition information is satisfied may be determined based on result information stored by the communications network element. For example, the condition information may be that a congestion packet loss rate is greater than k, and the communications network element may obtain a current congestion packet loss rate of a network, to determine whether the congestion packet loss rate is greater than k. A value of k may be determined based on a scenario. The policy function network element receives the query result sent by the communications network element. The policy function network element may determine, based on the query result, whether the condition information queried by the policy function network element is satisfied.

The communications network element may further receive a subscription from the policy function network element, and the communications network element may query in real time whether the condition information subscribed to by the policy function network element is satisfied. When finding that the condition information is satisfied, the communications network element may actively notify the policy function network element. The policy function network element may directly determine, based on the active notification of the communications network element, whether the first action in the first policy may be executed. The policy function network element may not need to perform real-time query. This improves execution efficiency of the action in the policy.

In some embodiments of this application, the first policy may include one or more pieces of condition information. When the first policy includes a plurality of pieces of condition information, the policy function network element may query, from the communications network element, whether the plurality of pieces of condition information are satisfied. The communications network element may query whether each piece of condition information is satisfied, and the communications network element may generate a query result for each piece of condition information. The query result includes whether the condition information is satisfied. The policy function network element may determine, based on the query results sent by the communications network element, condition information that is satisfied, and then perform step 604.

In some embodiments of this application, the first policy may include one or more pieces of condition information. When the first policy includes a plurality of pieces of condition information, the policy function network element may subscribe to, from the communications network element, a notification about whether the plurality of pieces of condition information are satisfied. The communications network element may query whether each piece of condition information is satisfied, and the communications network element may notify the policy function network element of condition information that is satisfied. The policy function network element may determine, based on the notification sent by the communications network element, the condition information that is satisfied, and then perform step 604.

604: The policy function network element triggers a target network element indicated by the action information to execute the first action in the first policy.

The target network element may receive the first action from the policy function network element, and then the target network element performs the first action. Different policies may indicate specific actions. In the embodiments of this application, precise policy control is implemented through collaboration of the modeling function network element, the policy function network element, and a data service function network element and with reference to an ML technology and a plurality of different network statuses.

When whether the condition information in the first policy is satisfied needs to be determined, that the policy function network element triggers a target network element indicated by the action information to execute the first action in the first policy in step 604 includes:

when the condition information is satisfied, triggering, by the policy function network element, the target network element indicated by the action information to execute the first action in the first policy.

In the embodiments of this application, the policy function network element triggers the target network element to execute the first action only when the condition information is satisfied, to control the target network element based on the condition information in the policy, and control the target network element when a condition needs to be queried.

For a specific implementation process of step 604, refer to step 410 in FIG. 4.

In some embodiments of this application, that the policy function network element triggers a target network element indicated by the action information to execute the first action in the first policy in step 604 includes:

triggering, by the policy function network element according to an order of execution corresponding to the first policy, the target network element to execute the first action in the first policy.

When the prediction function network element further stores an order of execution of a plurality of policies, the prediction function network element further sends the order of execution of the plurality of policies to the policy function network element. In this case, the policy function network element may receive the order of execution of the plurality of policies from the prediction function network element. The policy function network element determines, in the order of execution of plurality of policies, the order of execution corresponding the first policy. The policy function network element may trigger, according to the order of execution corresponding to the first policy, the target network element to execute the first action in the first policy. When one model triggers a plurality of policies, in addition to the policies, an order of execution of the policies is carried when the model is delivered, to ensure that actions in the policies are executed in order.

In some embodiments of this application, that the policy function network element triggers a target network element indicated by the action information to execute the first action in the first policy in step 604 includes:

determining, by the policy function network element based on a priority identifier corresponding to the first model, that a priority of the first model is a highest priority; and triggering, by the policy function network element, the target network element indicated by the first action corresponding to the first model with the highest priority to execute the first action in the first policy.

A plurality of models may be installed in the prediction function network element, and the models correspond to different priority identifiers. The priority identifiers of the models are used to identify priorities of different models. The prediction function network element may generate a prediction result by using each model, and the prediction function network element may send the prediction results of the plurality of models to the policy function network element. The policy function network element determines, based on the priority identifier corresponding to the first model, that the priority of the first model is the highest priority, and the policy function network element triggers the target network element indicated by the first action corresponding to the first model with the highest priority to execute the first action in the first policy. For a model without the highest priority, the policy function network element may not execute a corresponding action. When a plurality of models trigger a same policy, different models use a series of common policy-driven methods to reduce policy redundancy and orchestration complexity. The policy function network element may respond to an action corresponding to a model with a highest priority.

In some embodiments of this application, in addition to the foregoing steps, the policy-driven method provided in this embodiment of this application may further include the following step:

receiving, by the policy function network element, policy management indication information from the modeling function network element, where the policy management indication information includes a first to-be-managed policy identifier and a first management operation, or the policy management indication information includes a second to-be-managed policy identifier, a second management operation, and a to-be-managed policy; the first management operation includes at least one of the following operations: a policy deletion operation, a policy activation operation, a policy deactivation operation, or a policy query operation; the second management operation includes a policy installation operation and/or a policy update operation; and the to-be-managed policy includes an event, condition information, and action information that are corresponding to the second to-be-managed policy identifier.

The modeling function network element may further indicate the policy function network element to dynamically update the policy. For example, the policy function network element may dynamically update the policy according to the policy management indication information. For different types of policies, the modeling function network element may deliver different policy management indication information, and the policy function network element may provide a policy management interface, to facilitate managing the policies. For example, the first management operation that may be triggered by the modeling function network element for execution includes at least one of the following operations: the policy deletion operation, the policy activation operation, the policy deactivation operation, or the policy query operation. The second management operation that may further be triggered by the modeling function network element for execution includes the policy installation operation and/or the policy update operation. The to-be-managed policy includes the event, the condition information, and the action information that are corresponding to the second to-be-managed policy identifier. It should be noted that when a new policy may be installed or a policy may be updated, the policy management indication information may further carry the to-be-managed policy, to ensure that the policy function network element can successfully install the new policy or update an original policy.

Figure 7:
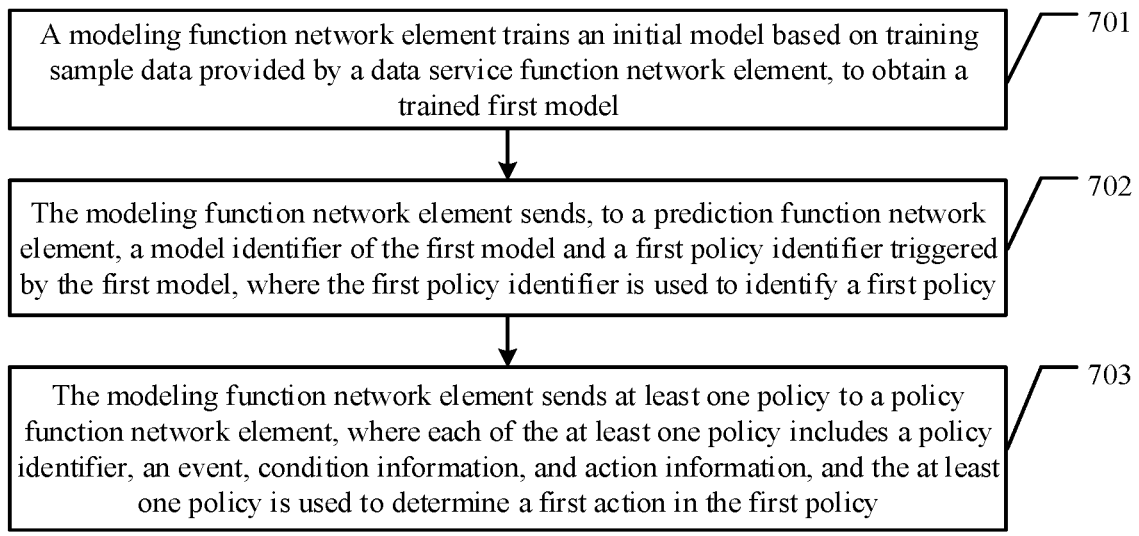
FIG. 7 is a schematic block flowchart of another policy-driven method according to an embodiment of this application.

The policy-driven method provided in the embodiments of this application is described from a perspective of the policy function network element in the foregoing embodiments. The following describes the policy-driven method provided in the embodiments of this application from a perspective of a modeling function network element. FIG. 7 is described with reference to FIG. 3 and FIG. 4. The modeling function network element may be the modeling function network element 102 in the embodiments shown in FIG. 1 and FIG. 2. Referring to FIG. 7, a policy-driven method according to an embodiment of this application may include the following steps.

701: The modeling function network element trains an initial model based on training sample data provided by a data service function network element, to obtain a trained first model.

In the embodiments of this application, the modeling function network element may obtain the training sample data from the data service function network element, and the modeling function network element may train the initial model by using the training sample data, to obtain the trained model. For ease of description, the trained model is referred to as a first model. A model in the embodiments of this application may be a machine learning model. The initial model may be trained by using the training sample data, to output the trained first model.

For a specific implementation process of step 701, refer to step 302 in FIG. 3 or step 402 in FIG. 4.

702: The modeling function network element sends, to a prediction function network element, a model identifier of the first model and a first policy identifier triggered by the first model, where the first policy identifier is used to identify a first policy.

For example, after obtaining the first model through training, the modeling function network element determines the model identifier of the first model and the policy identifier triggered by the first model. The policy identifier triggered by the first model is referred to as a first policy identifier. An interface is configured between the modeling function network element and the prediction function network element, and the modeling function network element may send the model identifier of the first model and the first policy identifier via the interface.

For a specific implementation process of step 702, refer to step 303 in FIG. 3 or step 403 in FIG. 4.

703: The modeling function network element sends at least one policy to a policy function network element, where each of the at least one policy includes a policy identifier, an event, condition information, and action information, and the at least one policy is used to determine a first action in the first policy.

For example, the event corresponds to a prediction result of a model. The condition information is a condition for determining a policy through matching. The action information includes an action that may be performed and a target network element that executes the action. The action included in the action information may be executed by the policy function network element, or may be executed by the target network element. This is not limited herein. An interface is configured between the modeling function network element and the policy function network element, and the policy function network element may obtain the at least one policy from the modeling function network element via the interface.

For a specific implementation process of step 703, refer to step 305 in FIG. 3 or step 405 in FIG. 4.

In some embodiments of this application, in addition to the foregoing steps, the policy-driven method provided in this embodiment of this application may further include the following step:

sending, by the modeling function network element, policy management indication information to the policy function network element, where the policy management indication information includes a first to-be-managed policy identifier and a first management operation, or the policy management indication information includes a second to-be-managed policy identifier, a second management operation, and a to-be-managed policy; the first management operation includes at least one of the following operations: a policy deletion operation, a policy activation operation, a policy deactivation operation, or a policy query operation; the second management operation includes a policy installation operation and/or a policy update operation; and the to-be-managed policy includes an event, condition information, and action information that are corresponding to the second to-be-managed policy identifier.

The modeling function network element may further indicate the policy function network element to dynamically update the policy, for example, dynamically update the policy according to the policy management indication information. For different types of policies that may be managed, the modeling function network element may deliver different policy management indication information. For example, the modeling function network element delivers policy management indication information via a policy management interface, to facilitate managing a policy by the policy function network element. For example, the first management operation that may be triggered by the modeling function network element for execution includes at least one of the following operations: the policy deletion operation, the policy activation operation, the policy deactivation operation, or the policy query operation. The second management operation that may further be triggered by the modeling function network element for execution includes the policy installation operation and/or the policy update operation. The to-be-managed policy includes the event, the condition information, and the action information that are corresponding to the second to-be-managed policy identifier.

It should be noted that when a new policy may be installed or an original policy may be updated, the policy management indication information may further carry the to-be-managed policy, to ensure that the policy function network element can successfully install the new policy or update the original policy.

In some embodiments of this application, in addition to the foregoing steps, the policy-driven method provided in this embodiment of this application may further include the following steps:

receiving, by the modeling function network element, a query request or subscription request for the condition information from the policy function network element; and querying, by the modeling function network element based on the query request, whether the condition information is satisfied to generate a query result, and notifying the policy function network element of the query result; or querying, by the modeling function network element based on the subscription request, whether the condition information is satisfied; and when the condition information is satisfied, notifying, by the modeling function network element, the policy function network element.

The policy function network element receives the query result sent by the communications network element, and determines, based on the query result, whether the condition information queried by the policy function network element is satisfied. Whether the condition information is satisfied may be determined based on result information stored by the communications network element. The communications network element may be the modeling function network element. The policy function network element sends the condition information to the modeling function network element in the following two manners: In one manner, the policy function network element sends the query request to the modeling function network element, and the modeling function network element replies the query result based on the request. In the other manner, the modeling function network element receives the subscription request of the policy function network element, actively performs a query, and then may actively notify the policy function network element that the condition information is satisfied. For example, the modeling function network element may query whether the condition information is satisfied; and when the condition information is satisfied, the modeling function network element notifies the policy function network element. The policy function network element may obtain, from the modeling function network element through interaction with the modeling function network element, whether the condition information is satisfied. The policy function network element may determine, based on the query result, whether to execute the first action, or the policy function network element may determine, based on the query result, whether to trigger the target network element to execute the first action in the first policy.

In the foregoing embodiment of this application, the modeling function network element may create the first model, and send the model identifier of the first model and the first policy identifier to the prediction function network element, so that the prediction function network element can install the first model. The modeling function network element further sends the at least one policy to the policy function network element, so that the policy function network element can install the at least one policy, to implement collaboration of a plurality of network elements among the policy function network element, the modeling function network element, and the prediction function network element. Precise policy control may be implemented with reference to an ML technology and based on different network statuses.

Figure 8:
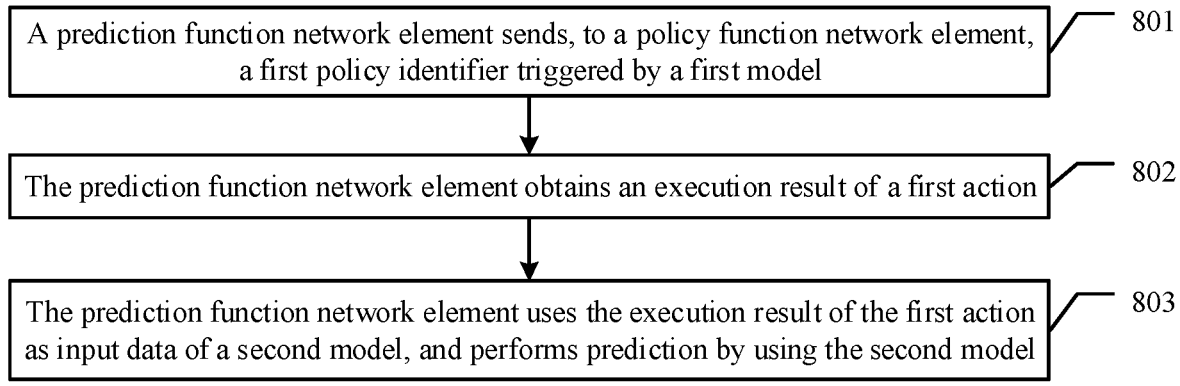
FIG. 8 is a schematic block flowchart of another policy-driven method according to an embodiment of this application.

The policy-driven method provided in the embodiments of this application is described from a perspective of the modeling function network element in the foregoing embodiments. The following describes the policy-driven method provided in the embodiments of this application from a perspective of a prediction function network element. FIG. 8 is described with reference to FIG. 3 and FIG. 4. The prediction function network element may be the prediction function network element 103 in the embodiments shown in FIG. 1 and FIG. 2. Referring to FIG. 8, a policy-driven method according to an embodiment of this application may include the following steps.

801: The prediction function network element sends, to a policy function network element, a first policy identifier triggered by a first model.

The first policy identifier is used to identify a first policy, and the first policy includes action information corresponding to a first action.

For example, the prediction function network element obtains a model identifier of a first model and the first policy identifier from a modeling function network element, the prediction function network element may install the first model, the prediction function network element obtains input data of the first model from a data service function network element, then the prediction function network element uses the input data to perform prediction by using the first model, and then the prediction function network element sends the first policy identifier via an interface between the prediction function network element and the policy function network element.

For a specific implementation process of step 801, refer to step 306 in FIG. 3 or step 406 in FIG. 4.

In some embodiments of this application, the policy-driven method provided in this embodiment of this application may further include: The prediction function network element sends a prediction result of the first model to the policy function network element, where the prediction result is used to determine the first action in the first policy.

The prediction function network element may perform prediction by using the first model, and obtain the prediction result. The first policy includes a policy identifier, an event, condition information, and action information. The event in the first policy may be null or non-null. When the event in the first policy is null, the policy function network element may not need to perform matching between the prediction result of the first model and the event. When the event in the first policy is non-null, the policy function network element may perform matching between the prediction result of the first model and the event in the first policy, to determine the first action that is in the first policy and that corresponds to the prediction result.

802: The prediction function network element obtains an execution result of the first action.

After the first action of the first model is executed by the policy function network element, the policy function network element may generate the execution result of the first action, and the prediction function network element may obtain the execution result of the first action.

For a specific implementation process of step 802, refer to step 309a in FIG. 3.

In some embodiments of this application, that the prediction function network element obtains the execution result of the first action in step 802 includes:

receiving, by the prediction function network element, the execution result of the first action from the policy function network element; or receiving, by the prediction function network element, the execution result of the first action from the data service function network element.

After the first action of the first model is executed by the policy function network element, the prediction function network element may receive the execution result of the first action. For example, the prediction function network element receives the execution result of the first action from the policy function network element, or the prediction function network element receives the execution result of the first action from the data service function network element.

803: The prediction function network element uses the execution result of the first action as input data of a second model, and performs prediction by using the second model.

For example, a plurality of models, such as the first model and the second model, are installed on the prediction function network element. The first model and the second model are different independent models. The prediction function network element may use the execution result of the first action as the input data of the second model, and perform prediction by using the second model. Therefore, a prediction output of the first model may trigger the second model to perform prediction, so that a plurality of models may jointly drive parameter optimization. The plurality of models do not need to be coupled together, so that a single model can be reused, to improve model reuse efficiency.

For a specific implementation process of step 803, refer to step 311 in FIG. 3.

In the foregoing embodiment of this application, the prediction function network element may predict the first model, and the prediction function network element may further input the execution result of the first action into the second model, and then perform prediction by using the second model. In the embodiments of this application, the first model and the second model may be jointly executed, and decoupling between a plurality of models may be implemented, to implement collaboration between the policy function network element and the prediction function network element. Precise policy control is implemented with reference to an ML technology and based on different network statuses.

Figure 9:
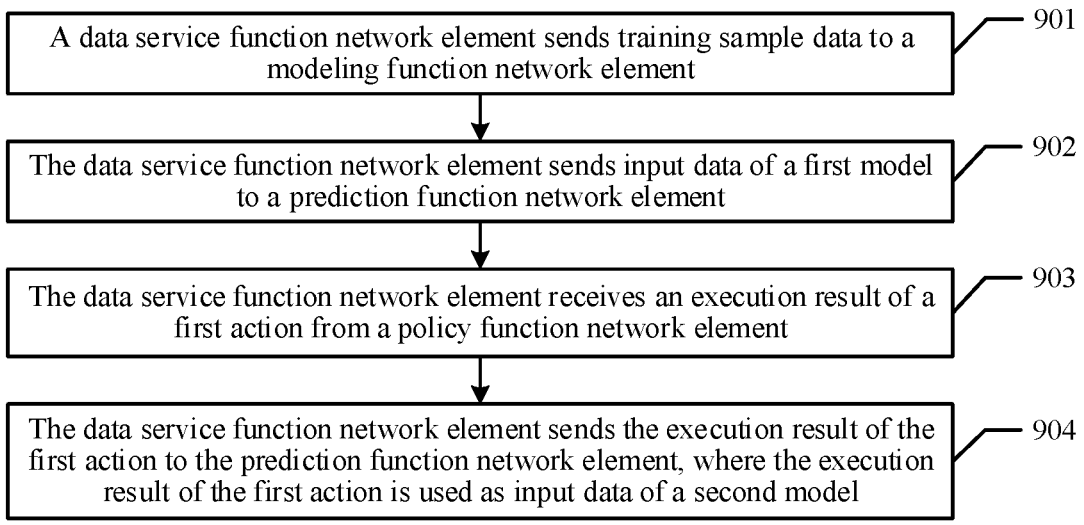
FIG. 9 is a schematic block flowchart of another policy-driven method according to an embodiment of this application.

The policy-driven method provided in the embodiments of this application is described from a perspective of the prediction function network element in the foregoing embodiments. The following describes the policy-driven method provided in the embodiments of this application from a perspective of a data service function network element. FIG. 9 is described with reference to FIG. 3 and FIG. 4. The data service function network element may be the data service function network element 104 in the embodiments shown in FIG. 1 and FIG. 2. Referring to FIG. 9, a policy-driven method according to an embodiment of this application may include the following steps.

901: The data service function network element sends training sample data to a modeling function network element.

For example, the training sample data is used to train a first model. The data service function network element stores the training sample data of the model. An interface is configured between the data service function network element and the modeling function network element, and the data service function network element may send the training sample data to the modeling function network element via the interface.

For a specific implementation process of step 901, refer to step 301 in FIG. 3 or step 401 in FIG. 4.

902: The data service function network element sends input data of a first model to a prediction function network element.

The data service function network element stores input data of various models. The data service function network element stores the input data of the first model, and sends the input data to the prediction function network element via an interface configured between the data service function network element and the prediction function network element. Therefore, the prediction function network element may obtain the input data from the data service function network element. Then, the prediction function network element uses the input data to perform prediction by using the first model.

For a specific implementation process of step 902, refer to step 304 in FIG. 3 or step 404 in FIG. 4.

903: The data service function network element receives an execution result of a first action from a policy function network element.

The execution result of the first action is related to the input data of the first model. The data service function network element receives the execution result of the first action from the policy function network element, and the execution result of the first action may be used as input data of a second model.

For a specific implementation process of step 903, refer to step 309b in FIG. 3.

In some embodiments of this application, that the data service function network element receives an execution result of a first action from a policy function network element in step 903 includes:

receiving, by the data service function network element, the execution result of the first action from the policy function network element via an interface between the policy function network element and the data service function network element.

The interface is configured between the policy function network element and the data service function network element. The policy function network element sends the execution result of the first action to the data service function network element via the interface. A format and communication manner of a transmission protocol are not limited for the interface configured between the data service function network element and the policy function network element. Data may be efficiently transmitted between the policy function network element and the data service function network element via the interface between the policy function network element and the data service function network element, and a plurality of models are decoupled.

904: The data service function network element sends the execution result of the first action to the prediction function network element, where the execution result of the first action is used as input data of a second model.

A plurality of models, such as the first model and the second model, are installed on the prediction function network element. After the first action of the first model is executed by the policy function network element, the policy function network element may generate the execution result of the first action, and the policy function network element may send the execution result of the first action to the data service function network element. Then, the data service function network element sends the execution result of the first action to the prediction function network element, and the prediction function network element may use the execution result of the first action as the input data of the second model.

For a specific implementation process of step 904, refer to step 310 in FIG. 3.

In the foregoing embodiment of this application, the data service function network element may separately provide data for the modeling function network element and the prediction function network element. For example, the data service function network element sends the execution result of the first action to the prediction function network element. The execution result of the first action may be used as the input data of the second model, so that the first model and the second model may be jointly executed, decoupling between a plurality of models may be implemented, and collaboration of a plurality of network elements may be implemented among the data service function network element, the policy function network element, and the prediction function network element. Precise policy control is implemented with reference to an ML technology and based on different network statuses.

To better understand and implement the foregoing solution in the embodiments of this application, the following uses a corresponding application scenario as an example for detailed description.

Figure 10:
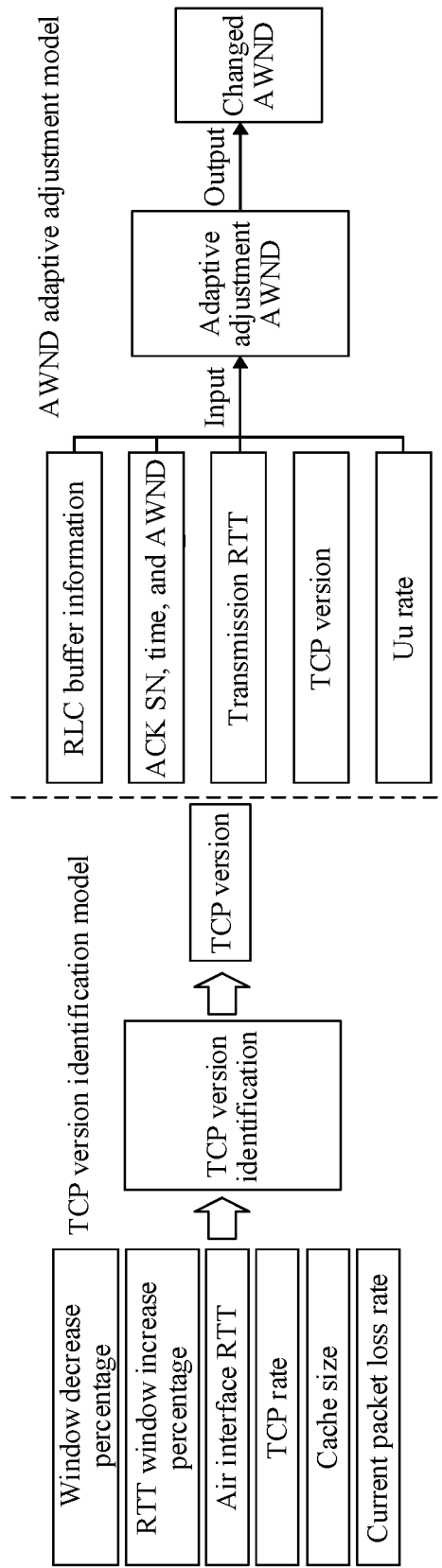
FIG. 10 is a schematic diagram of sequentially executing two models in a prediction function network element in an embodiment of this application according to a model execution order.

FIG. 10 is a schematic diagram of sequentially executing two models in a prediction function network element in an embodiment of this application according to a model execution order. A cross-layer optimization scenario of a fusion application soft terminal (Fusion Application Software Terminal, FAST) is used as an example. A buffer on a base station side is mainly used to determine rates of a transmit end and a receive end through matching, to improve a transmission control protocol (Transmission Control Protocol, TCP) rate. However, if a window size needs to be reduced due to packet loss when different versions of TCPs are used, different algorithms use different proportions to reduce the window size. In addition, in a congestion avoidance phase, a window size increase manner varies with an algorithm. An advertised window (Advised Window, AWND) may be adjusted in different manners for different TCP versions. In this embodiment of this application, the following two models may be used: a TCP version identification model and an AWND adaptive adjustment model. Input data of the TCP version identification model may include a window decrease percentage, a radio transmission technology (Radio Transmission Technology, RTT) window increase percentage, an air interface RTT, a TCP rate, a buffer size, and a current packet loss rate. A prediction result may be output by using the TCP version identification model, and the prediction result may include a predicted TCP version. The prediction result of the TCP version identification model may be used as input data of the AWND adaptive adjustment model. For example, in addition to a TCP version, the input data of the AWND adaptive adjustment model may further include radio link control (Radio Link Control, RLC) protocol buffer information, an ACK sequence number (Sequence Number, SN), a time, an AWND, a transmission RTT, and a Uu rate. Uu refers to a radio interface between a terminal and a base station in a 3G network, and a changed AWND may be output by using the AWND adaptive adjustment model. After the TCP version identification model and the AWND adaptive adjustment model in the prediction function network element separately perform prediction, the prediction function network element may send a prediction result and a policy indication of each model to a policy function network element. When a plurality of models on the prediction function network element jointly drive parameter optimization, an association between different models may be orchestrated in advance by using policies.

For another example, in experience awareness and improvement of an encrypted service, an experience awareness model of an encrypted application is output through learning based on third-party labeled data and offline network data, and the model is run in real time to identify a service flow with poor experience. If a service flow with poor user experience is identified, this event may be reported. If a network is congested, this event may be reported to a PCF to trigger the PCF to adjust a policy. If a problem is caused by network coverage, the policy function network element may report this event to an OSS to trigger the OSS to perform coverage and capacity optimization (Coverage and Capacity Optimization, CCO).

It should be noted that, a model output in the prediction function network element is merely used to indicate that an event occurs, and the policy function network element determines, based on a current network condition, to report the event to a related network element. Alternatively, a corresponding policy may be orchestrated in advance on the policy function network element to determine network elements to which a prediction result is reported in a condition.

The following describes an actual application scenario of the policy function network element, the modeling function network element, the prediction function network element, and the data service function network element by using an example. An example in which the modeling function network element is an AMF, the prediction function network element is an MEF, the policy function network element is an APF, and the data service function network element is a DSF is used for description.

Figure 11:
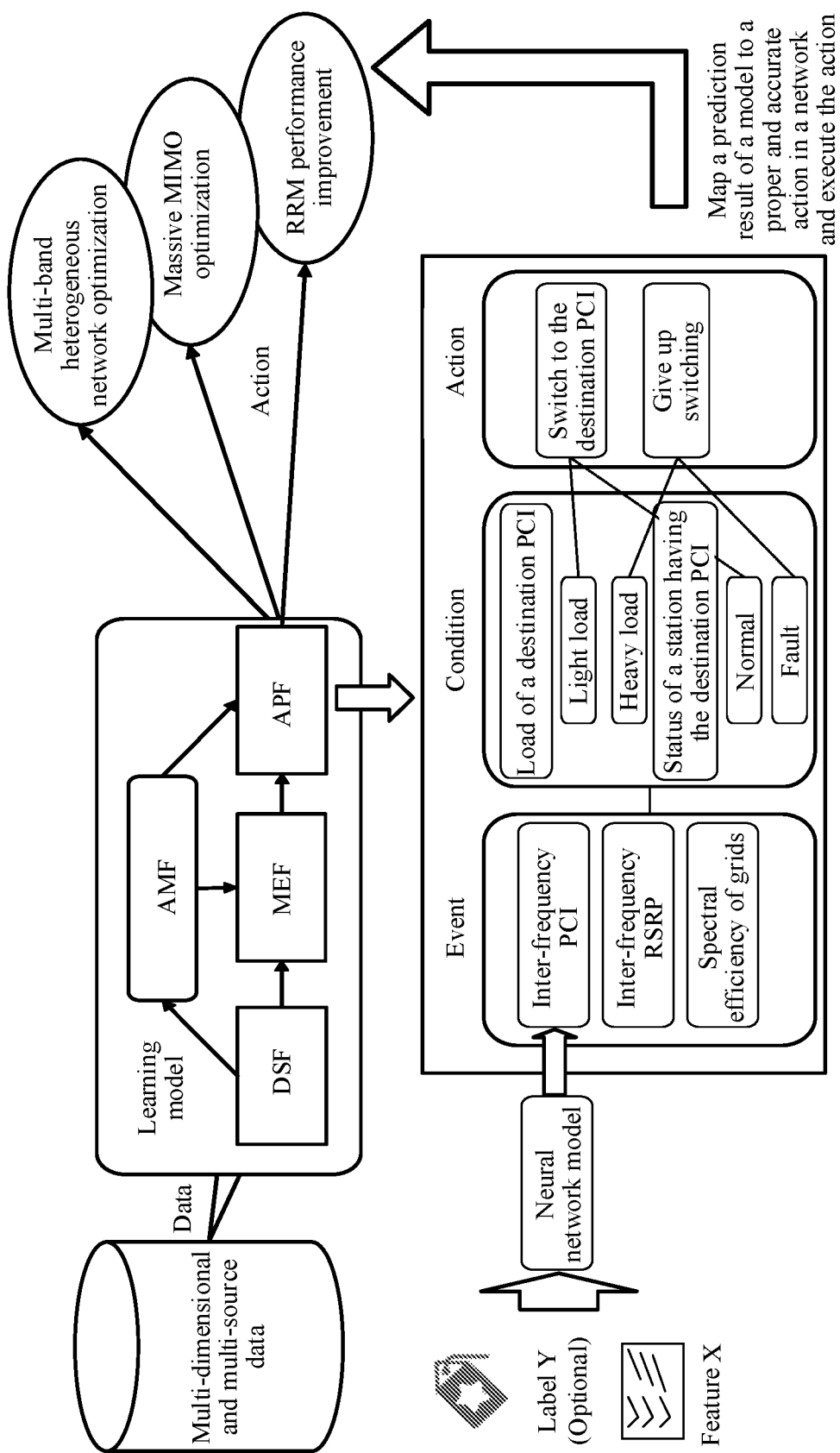
FIG. 11 is a schematic diagram of a handover scenario in which a prediction result of a model is applied to inter-frequency or inter-RAT according to an embodiment of this application.

FIG. 11 is a schematic diagram of a handover scenario in which a prediction result of a model is applied to inter-frequency or inter-RAT according to an embodiment of this application. In a virtual grid-based inter-frequency or inter-RAT handover scenario, a granularity of a current cell-level algorithm is refined to a virtual grid. A wireless network uses cellular coverage, and a smallest unit covered by the wireless network is referred to as a cell. The virtual grid is a concept in a high-resolution network, and a minimum granularity of the network is changed from a cell to a virtual grid. Performance of coverage-based inter-frequency or inter-RAT handover may be improved by performing a virtual grid-based operation. The virtual grid model may include a plurality of models, such as a neural network model or an SVM model. In FIG. 11, an example in which a virtual grid model is a neural network model is used for description. A learning model may be installed on the MEF. The MEF uses the learning model to perform prediction, and sends, to the APF, a policy identifier triggered by the learning model. Multi-dimensional and multi-source data may be input to the learning model from the outside. The multi-dimensional and multi-source data means data that has a plurality of dimensions and that are from a plurality of different sources. The DSF provides the data for the MEF, and the AMF provides the model for the MEF. The MEF performs prediction by using the model, and sends a prediction result and a policy identifier to the APF. The APF selects an action through matching between the prediction result and the policy identifier, and triggers different target network elements based on different actions. After performing corresponding actions, the target network elements may implement multi-band heterogeneous network optimization, massive multiple-input multiple-output (Multiple-Input Multiple-Output, MIMO) optimization, or radio resource management (Radio Resource Management, RRM) performance improvement.

Input data of the virtual grid model, namely, a feature X, includes historical grid data. The historical grid data includes an intra-frequency measurement report (Measurement Report, MR), an inter-frequency measurement report MR, and reference signal received power (Reference Signal Receiving Power, RSRP) information (only intra-frequency information) of a grid that is currently to be predicted. An output is a KPI prediction result of the to-be-predicted grid. In a model training phase, the AMF performs training by using the feature X and a label Y (for example, a predicted KPI value of the to-be-predicted grid) to obtain the virtual grid model. In a model prediction phase, the MEF predicts the KPI prediction result of the to-be-predicted grid by using the feature X of a live network. The prediction result corresponds to an event in a policy. For example, the event may include an inter-frequency PCI, inter-frequency RSRP, and spectral efficiency of grids. The APF performs action matching based on the prediction result of the virtual grid model. For example, determined action information may include: UE switches to a destination PCI, or gives up switching. In addition, the APF may determine, based on condition information, whether the UE switches to a station having a destination PCI. For example, the condition information may include: a load status (for example, light load or heavy load) of the destination PCI, and/or a station status (e.g. normal or faulty) of the station having the destination PCI.

Figure 12:
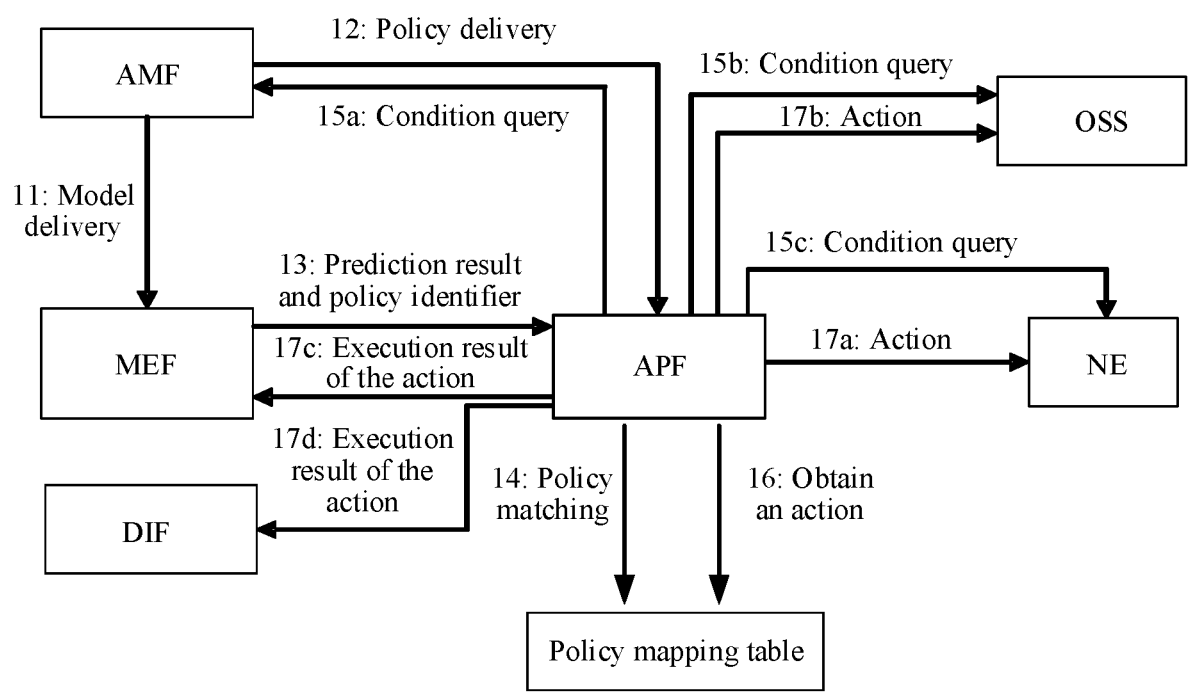
FIG. 12 is a schematic diagram of a system architecture in which a plurality of network elements interact with each other to implement a policy-driven method according to an embodiment of this application.

FIG. 12 is a schematic diagram of a system architecture in which a plurality of network elements interact with each other to implement a policy-driven method according to an embodiment of this application. The following processes are mainly included.

11: An AMF delivers a trained model to an MEF, where the model sent to the MEF further carries a policy identifier (namely, a policy ID) corresponding to the model.

12: The AMF delivers at least one policy to an APF.

For example, each of the at least one policy may include a policy identifier, an event, condition information, and action information. The condition information may also be referred to as a condition statement (condition statement). The action information may also be referred to as an action statement (action statement). The event corresponds to a prediction result of a model. For the model, the event is referred to as a prediction result. For the policy, the event is referred to as an event.

It should be noted that a plurality of policies may form a policy mapping table. For example, columns represent a policy identifier, an event, condition information, and action information respectively. The table includes a plurality of rows, and each row represents a policy. One policy may include one action, or may include a plurality of actions. In addition, condition information in a policy may be null or may be non-null. When the condition information is non-null, before an action is executed, whether the condition information is satisfied may be first determined, and the corresponding action can be executed only when the condition information is satisfied. A plurality of policies delivered by the AMF to the APF are described by using examples in Table 1.

TABLE 1

| Policy identifier | Event | Condition information | Action information |
|---|---|---|---|
| 15567 | { } | { } | The APF triggers an NE or OSS to modify a parameter A to the prediction result |
| 17239 | y1 | { } | The APF triggers a PCF to modify a parameter B to M1 |
|  | y2 | { } | The APF triggers the PCF to modify the parameter B to M2 |
| 18000 | { } | { } | The APF sends the execution result of the action to a DIF or the MEF |
| 20001 | z | Congestion packet loss rate > k | The APF reports the event and the condition to the PCF |
|  |  | Serving cell RSRP < optimal DLRSCP threshold, and serving cell Ec/Io < worst Ec/Io threshold | The APF reports the event and the condition to the OSS |

With reference the examples in Table 1, it indicates that the AMF sends a universal set including the at least one policy to the APF. For example, the universal set includes four policies. A policy identifier of the first policy is 15567, a corresponding event is null, and condition information is null. In this case, matching does not need to be performed between the prediction result and the event, and whether the condition information is satisfied does not need to be queried. Action information included in the policy corresponding to the policy identifier 15567 is: The APF triggers the NE or the OSS to modify the parameter A to the prediction result of the first model. For another example, a policy identifier of the second policy is 17239, and corresponding events include y1 and y2. Condition information corresponding to the events y1 and y2 is null. Matching is performed between the prediction result of the first model and the events y1 and y2. If the prediction result successfully matches the event y1, action information corresponding to the event y1 is executed: The APF triggers the PCF to modify the parameter B to M1. If the prediction result successfully matches the event y2, action information corresponding to the event y2 is executed: The APF triggers the PCF to modify the parameter B to M2. For another example, a policy identifier of the third policy is 18000, a corresponding event is null, and condition information is null. Action information included in the policy corresponding to the policy identifier 18000 is: The APF sends the execution result of the action to the DSF or the MEF. For another example, a policy identifier of the fourth policy is 20001, and the prediction result successfully matches an event z. There are two types of condition information: One type of information is that a congestion packet loss rate is greater than k, and the other type of information is that serving cell RSRP is less than an optimal DLRSRP threshold and a serving cell Ec/Io is less than a worst Ec/Io threshold. The APF may query, from a communications network element, whether the two types of condition information are satisfied. The communications network element queries whether each piece of condition information is satisfied and generates a query result. The query result may include the condition information and whether the condition information is satisfied. After receiving the query result, the APF executes an action corresponding to satisfied condition information. For another example, the APF may subscribe to, from the communications network element, notifications about whether the two types of condition information are satisfied. The communications network element queries whether each piece of condition information is satisfied, and notifies the APF of satisfied condition information. After receiving the notification from the communications network element, the APF executes an action corresponding to the satisfied condition information. For example, action information corresponding to the first type of condition information is: The APF reports the event and the condition to the PCF. Action information corresponding to the second type of condition information is: The APF reports the event and the condition to the OSS. Ec is chip energy (chip energy), and Io is interference from other cell, where I is short for interference (Interfere), and o is short for other cell (Other Cell). Ec/Io indicates a ratio of received chip signal strength to noise strength.

13: The MEF uses the model to perform prediction and sends a prediction result and the policy identifier to the APF.

The MEF sends the prediction result of the model and the policy identifier to the APF. The MEF sends a policy subset to the APF. To be specific, the policy subset includes the policy identifier and the prediction result output during model prediction. For example, with reference to Table 1, the policy identifier is 17239, and the output prediction result is y2.

14: The APF performs policy matching based on a plurality of stored policies, and determines a policy that successfully matches the policy identifier.

The MEF sends the policy identifier to the APF. The APF may select a policy from the plurality of policies through matching based on the policy identifier. The policy selected through matching includes condition information. Then, the APF queries, from the communications network element, whether the condition information is satisfied. Specifically, the APF may perform any one of step 15a, step 15b, or step 15c.

15a: The APF queries, from the AMF, whether the condition information is satisfied.

15b: The APF queries, from the OSS, whether the condition information is satisfied.

15c: The APF queries, from the NE, whether the condition information is satisfied.

It should be noted that, a condition is queried after only one of step 14a, step 14b, or step 14c is performed.

The APF determines the policy corresponding to the policy identifier. If the condition information is non-null, the APF queries, from the AMF, the OSS, or the NE, whether the condition information is satisfied. A network element from which the APF queries whether the condition information is satisfied may be determined based on an actual scenario. The AMF, the OSS, or the NE may determine whether the condition information is satisfied, and send a query result to the APF. The APF may determine, based on the query result, whether to execute an action. For example, as shown in Table 1, the policy identifier of the fourth policy is 20001. There are two types of condition information: One type of information is that the congestion packet loss rate is greater than k, and the other type of information is that the serving cell RSRP is less than the optimal DLRSRP threshold and the serving cell Ec/Io is less than the worst Ec/Io threshold. For example, the APF may query, from the communications network element, whether the two types of condition information are satisfied. The communications network element queries whether each piece of condition information is satisfied and generates the query result. The query result may include the condition information and whether the condition information is satisfied. After receiving the query result, the APF executes the action corresponding to satisfied condition information.

16: The APF obtains, based on the determined policy, an action corresponding to action information included in the policy.

For example, with reference to Table 1, if condition information in a policy is null, it indicates that no condition information is set in the corresponding policy. Therefore, whether the condition information is satisfied does not need to be queried, and the APF may directly execute an action included in the policy, or the APF triggers a target network element to execute the action. For example, if the APF receives the policy identifier 17239 from the MEF, the APF may select the second policy in Table 1 through matching based on the policy identifier. The prediction result received by the APF from the MEF is the event y2, and the APF triggers the PCF to set the parameter B to M2. For another example, the APF receives the policy identifier 20001 from the MEF, and the prediction result received by the APF from the MEF is the event z. The APF may query, from the AMF, the OSS, or the NE, whether the condition information is satisfied, for example, query whether the congestion packet loss rate is greater than k. When the condition information is satisfied, the APF may determine the action corresponding to the condition information. It should be noted that, if a policy includes two pieces of condition information. If the two pieces of condition information are independent of each other, and both the pieces of condition information are satisfied, an action corresponding to each piece of condition information needs to be performed.

17a: The APF sends the determined action to the NE, to trigger the NE to execute the corresponding action.

For example, the NE may be specifically the PCF. For descriptions of the NE, refer to the descriptions in the foregoing embodiments.

17b. The APF sends the determined action to the OSS, to trigger the OSS to execute the corresponding action.

17c. The APF executes the determined action, and sends an execution result of the action to the MEF.

17d. The APF executes the determined action, and sends an execution result of the action to the DSF.

It should be noted that only one of steps 17a to 17d needs to be performed. Specifically, whether the APF performs the action or sends the action to another network element such as the NE or the OSS may be determined based on the action determined in step 16.

Figure 13:
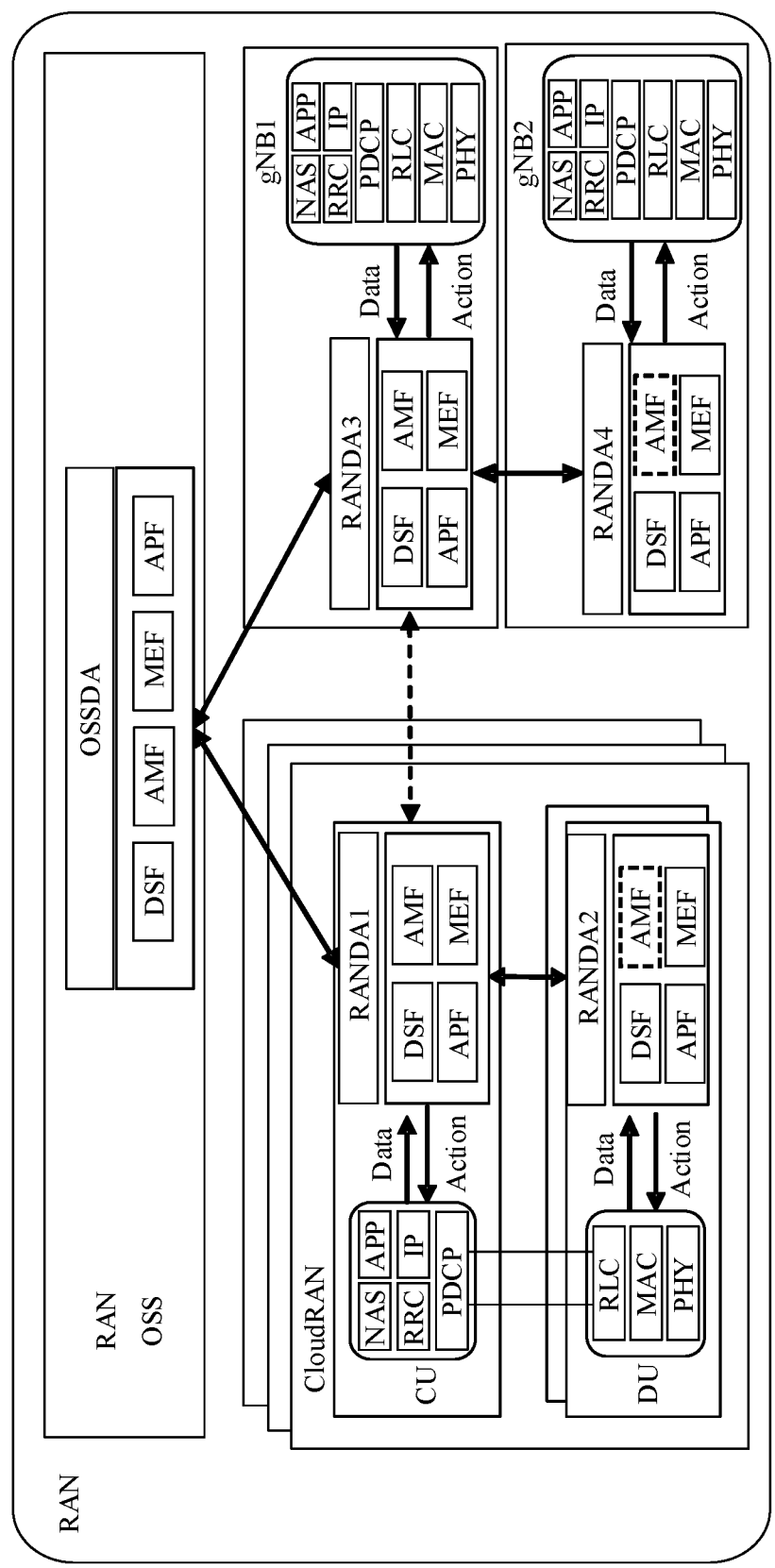
FIG. 13 is a schematic diagram of a scenario in which a plurality of models in a RAN system are jointly used for parameter optimization according to an embodiment of this application.

FIG. 13 is a schematic diagram of a scenario in which a plurality of models in a RAN system are jointly used for parameter optimization according to an embodiment of this application. Policy-driven in a RAN scenario is used as an example for description. The RAN scenario includes a RAN OSS, a cloud (Cloud) RAN, and a gNodeB (gNodeB, gNB).

The RAN OSS side may include an operations support system data analytics (Operations Support System Data Analytics, OSSDA) network element.

The cloud RAN may include a central unit (central unit, CU), a distributed unit (distributed unit, DU), a radio access network data analytics (RAN Data Analytics, RANDA) 1, and a RANDA 2. The DU may be configured to implement at least one function of a physical layer (physical layer, PHY), a media access control (Media Access Control, MAC) layer, and an RLC layer. The CU may be configured to implement at least one function of a packet data convergence protocol (Packet Data Convergence Protocol, PDCP) layer, an internet protocol (Internet Protocol, IP) layer, an application (Application, APP) layer, an RRC layer, and a non-access stratum (Non Access Stratum, NAS) layer. The CU may send data to the RANDA 1, and the RANDA 1 may send an action to the CU. Similarly, the DU may also send data to the RANDA 2, and the RANDA 2 may send an action to the DU.

There may be a plurality of gNBs in the RAN scenario, for example, a gNB 1 and a gNB 2 shown in FIG. 13. The gNB 1 may be specifically a master gNB. The master gNB may implement at least one function of the PHY layer, the MAC layer, the RLC layer, the PDCP layer, the IP layer, the APP layer, the RRC layer, and the NAS layer. The gNB 1 may send data to a RANDA 3, and the RANDA 3 may send an action to the gNB 1. Similarly, the gNB 2 may also send data to a RANDA 4, and the RANDA 4 may send an action to the gNB 2.

It should be noted that the policy-driven method provided in the embodiments of this application is applicable to the scenario in which a plurality of models are jointly used for parameter optimization, or is also applicable to a scenario in which a model output is used only to indicate an event, and parameter optimization and rule adjustment are driven with reference to a network condition. The RANDA 1 may interact with the CU. Similarly, the RANDA 2 may interact with the DU, the RANDA 3 may interact with the gNB 1, and the RANDA 4 may interact with the gNB 2. A logical function of each RANDA may further be decomposed into functions performed by a DSF, an AMF, an MEF, and an APF respectively. For details, refer to descriptions in the foregoing embodiments. It may be understood that the function of the RANDA is independently deployed on a network element entity, and the network element entity may be referred to as a RANDA network element. The RANDA network element is deployed in at least three manners: 1. deployed on an LTE eNodeB; 2. deployed on a radio network controller (Radio Network Controller, RNC) or a NodeB of a universal mobile telecommunications system (Universal Mobile Telecommunications System, UMTS) system; 3. deployed on a CU, a DU, or a gNB in a 5G network. The RANDA deployed in the three manners may be specifically NodeB data analytics (NodeB Data Analytics, NBDA).

Figure 14:
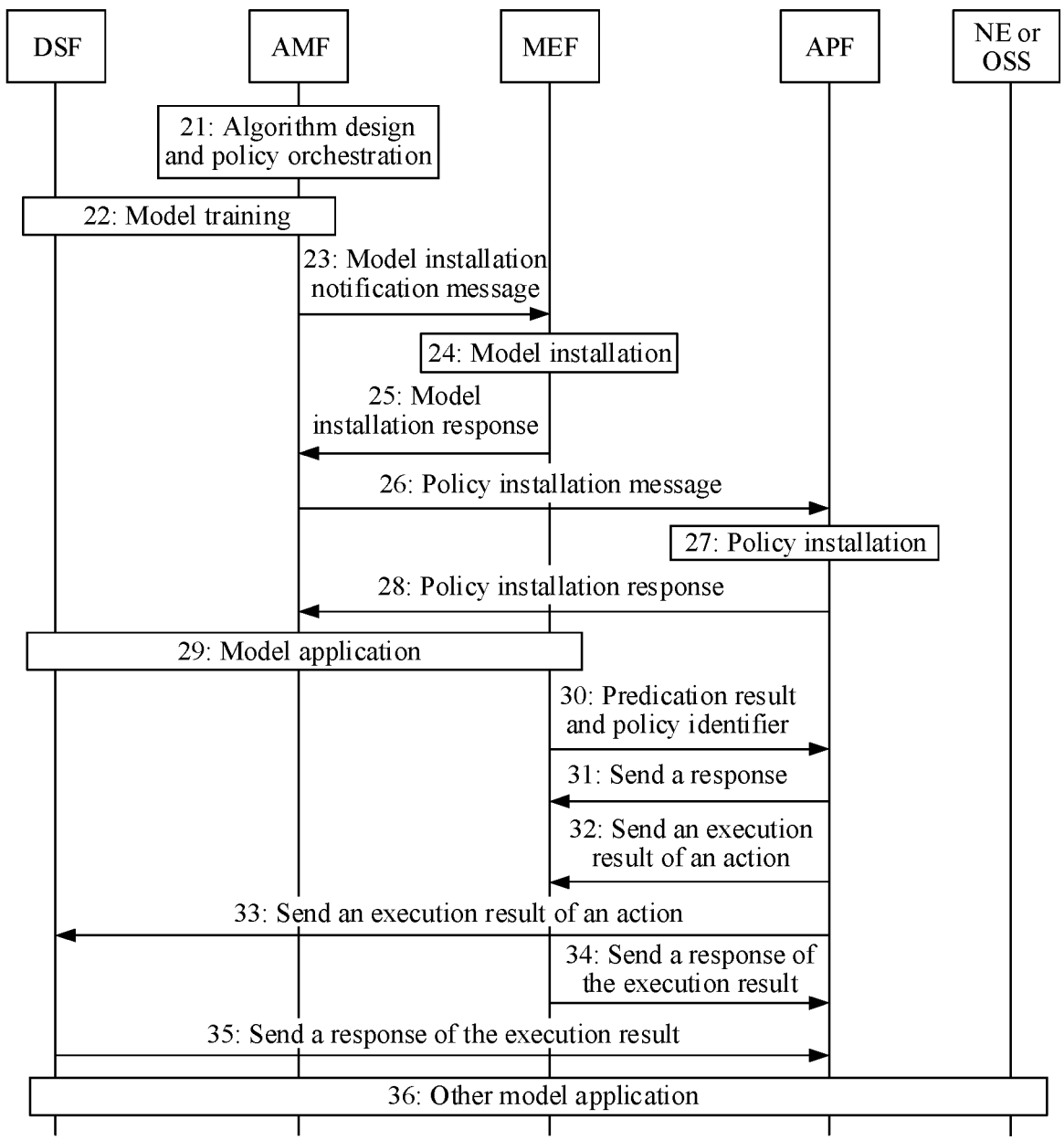
FIG. 14 is a schematic interaction flowchart showing that a plurality of network elements interact with each other to implement a policy-driven method according to an embodiment of this application.

FIG. 14 is a schematic interaction flowchart showing that a plurality of network elements interact with each other to implement a policy-driven method according to an embodiment of this application. This embodiment is described by using FAST cross-layer optimization as an example. In addition, FIG. 14 is described with reference to FIG. 15. A procedure in this embodiment is also applicable to another scenario. The method includes the following procedures.

21: Algorithm design and policy orchestration.

Figure 15:
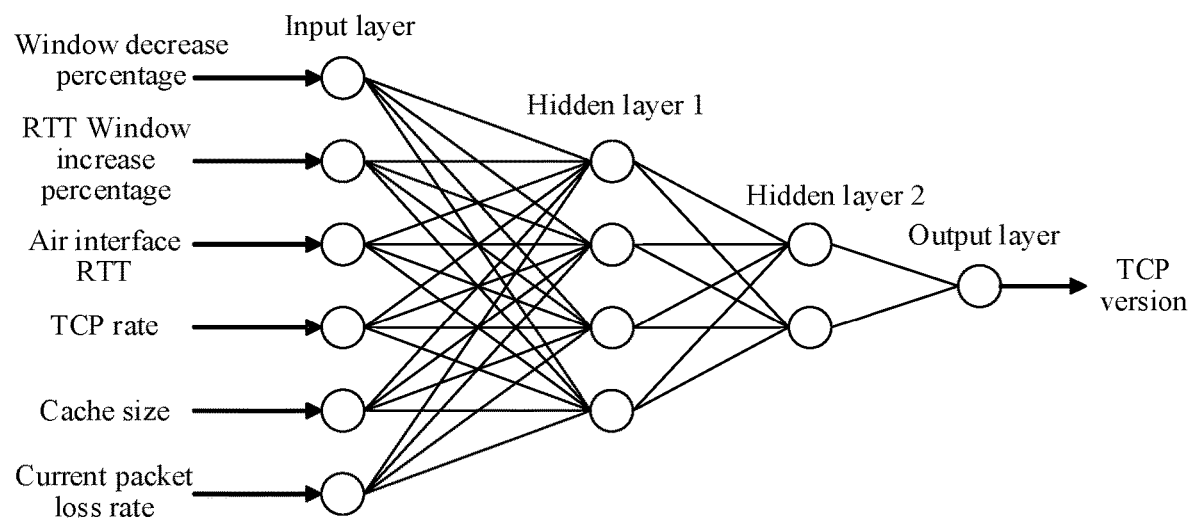
FIG. 15 is a schematic diagram of a training process of a neural network model according to an embodiment of this application.

FIG. 15 is a schematic diagram of a training process of a neural network model according to an embodiment of this application. For example, a model created by an AMF is a neural network model. For example, the neural network model may include a TCP version identification model. In the algorithm design phase, a quantity of nodes of an input layer (input layer) of a neural network, a feature represented by each node, a quantity of hidden layers (hidden layer), a quantity of nodes on each layer between the input layer and an output layer, a quantity of nodes on the output layer (output layer), a meaning of each node, and an activation function may be orchestrated. A neural network of a 6×4×2×1 structure is used herein. The nodes on the input layer are a window decrease percentage, an RTT window increase, an air interface RTT, a TCP packet receiving rate, a buffer size, and a current packet loss rate respectively, which are represented as $x_1$, $x_2$, $x_3$, $x_4$, $x_5$, and $x_6$, respectively. The node on the output layer represents a TCP version. A policy identifier corresponding to the TCP version identification model is a policy identifier 1, and specific content is to convert a model output into a real TCP version. For example, that a prediction result is 1 indicates that the TCP version is NewReno (NewReno); that a prediction result is 2 indicates that the TCP version is Cubic (CUBIC); that a prediction result is 3 indicates that the TCP version is C-TCP. An APF sends a result to a DSF or an MEF.

22: Model training.

The model training process is to determine a weight and a threshold. Herein, neural network training is used as an example to specifically describe how to train a model. A specific training method varies with a network structure and a model. This is not limited in the embodiments of this application. Before the model training process is described, the weight and the threshold are first described. First, the weight is explained. Various inputs seldom have equal importance. Some inputs are decisive factors, and other inputs are secondary factors. Therefore, weights (weight) may be specified for these inputs to represent their different importance. A sum obtained after inputs of an upper layer are multiplied by corresponding weights is used as an input of a lower layer. For example, there are 6×4+4×2+2×1=34 weights in total. Next, the threshold (threshold) is described. If an output result of the output layer output layer is greater than the threshold, the neural network outputs 1. Otherwise, the neural network outputs 0. A plurality of thresholds may be specified for a multi-class classification problem.

To estimate the weight and the threshold, a trial and error method is usually used. To be specific, other parameters remain unchanged, a slight change of the weight or the threshold is denoted as Δweight (or Δthreshold), and then an output change is observed. This process is repeated until a group of a weight and a threshold that most precisely corresponds to the output is obtained.

23: The AMF sends a model installation notification message to the MEF.

In addition to a model identifier, the notification message further carries a policy identifier.

24: Model installation.

The MEF receives the model installation notification message, and allocates corresponding model installation and execution resources. For example, in this embodiment of this application, the MEF allocates resources for installing and executing the neural network model, and the MEF records an installed model in a local repository (repository), to record and query a model execution status. Design and analysis are performed in terms of implementation, and the MEF is considered as a model prediction process. Each time a model is installed, a related thread is started.

25: The MEF sends a model installation response.

26: The AMF sends a policy installation message to the APF, where the message carries a universal set of policies that may be triggered by the model, for example, all the policies in Table 1. Each policy includes a policy identifier, an event, action information, and condition information. For descriptions of the examples of the policies, refer to descriptions in the foregoing embodiments.

27: The APF installs a policy sent by the AMF.

28: The APF sends a policy installation response to the AMF.

29: Model application.

A model application process is a process in which input data is input into the model, and prediction is performed by using the model to generate a prediction result. The input data of the model may be obtained by the MEF by requesting the DSF based on the model installation notification message.

30: The MEF sends the prediction result and the policy identifier to the APF.

The TCP version identification model is used as an example. The MEF uses the TCP version identification model to perform prediction. If the prediction result of the model is 2, the prediction result of the model herein is: The TCP version is Cubic.

31: The APF sends a response to the MEF, to acknowledge that the APF receives the prediction result and the policy identifier.

32: The APF sends an execution result of an action to the MEF.

33: The APF sends an execution result of an action to the DSF.

Only one of step 31 and step 32 needs to be performed.

The APF queries for the corresponding policy based on the policy identifier, and determines the action based on the policy and the prediction result. After executing the action, the APF generates the execution result, and delivers the execution result of the action to the corresponding DSF or MEF (that is, performs any one of steps 32 and 33).

After step 32 is performed, step 34 is performed. After step 33 is performed, step 35 is performed.

34: The MEF sends a response of the execution result to the APF.

35: The DSF sends a response of the execution result to the APF.

Only one of step 34 and step 35 needs to be performed.

36: Other model application.

In step 30, the MEF generates the prediction result of the model. The APF generates the execution result after executing the action, and sends the execution result of the action to the MEF or the DSF, so that the DSF may store the execution result of the action. The execution result of the action may be used as input data of another model.

In this embodiment of this application, the policy is orchestrated in advance and delivered in advance with the model. The APF may determine the policy based on the prediction result and the policy identifier that are sent by the MEF. The APF may locally execute the action, to reduce a policy response time. It may be learned from the examples in the foregoing embodiments of this application that, the MEF and APF may be deployed on a same network element. This reduces a delay in interaction between the MEF and the APF. In addition, the model output is used as an input of another model by using a policy, so that models in the MEF may be decoupled. Each model can be reused after being independently deployed. Only each policy needs to be orchestrated, and execution of each model may be determined based on whether input data of the model is obtained. Therefore, in this embodiment of this application, model orchestration may not need to be performed. The model orchestration means orchestration of a model execution order. When a plurality of models jointly complete one thing, if the models are not decoupled, an order of execution of the models may be clearly described. For example, in the foregoing TCP optimization scenario, the TCP version identification model needs to be first executed, and the output of the model is sent to the AWND adaptive adjustment model. In the embodiments of this application, a coupling relationship between models is not limited. Outputs of all models are sent to the APF, and the APF determines, based on the action information, whether to send the outputs to the DSF or another network element. If an output of a model is used as an input of another model, the output is directly sent to the DSF. The output may be used by a plurality of models.

In this embodiment of this application, the APF delivers the execution result of the action to the DSF or the MEF, and is used as an input of another model. This is applicable to a scenario in which a plurality of models are used together to resolve a problem, and expands an application scope of machine learning in a wireless network.

Figure 16:
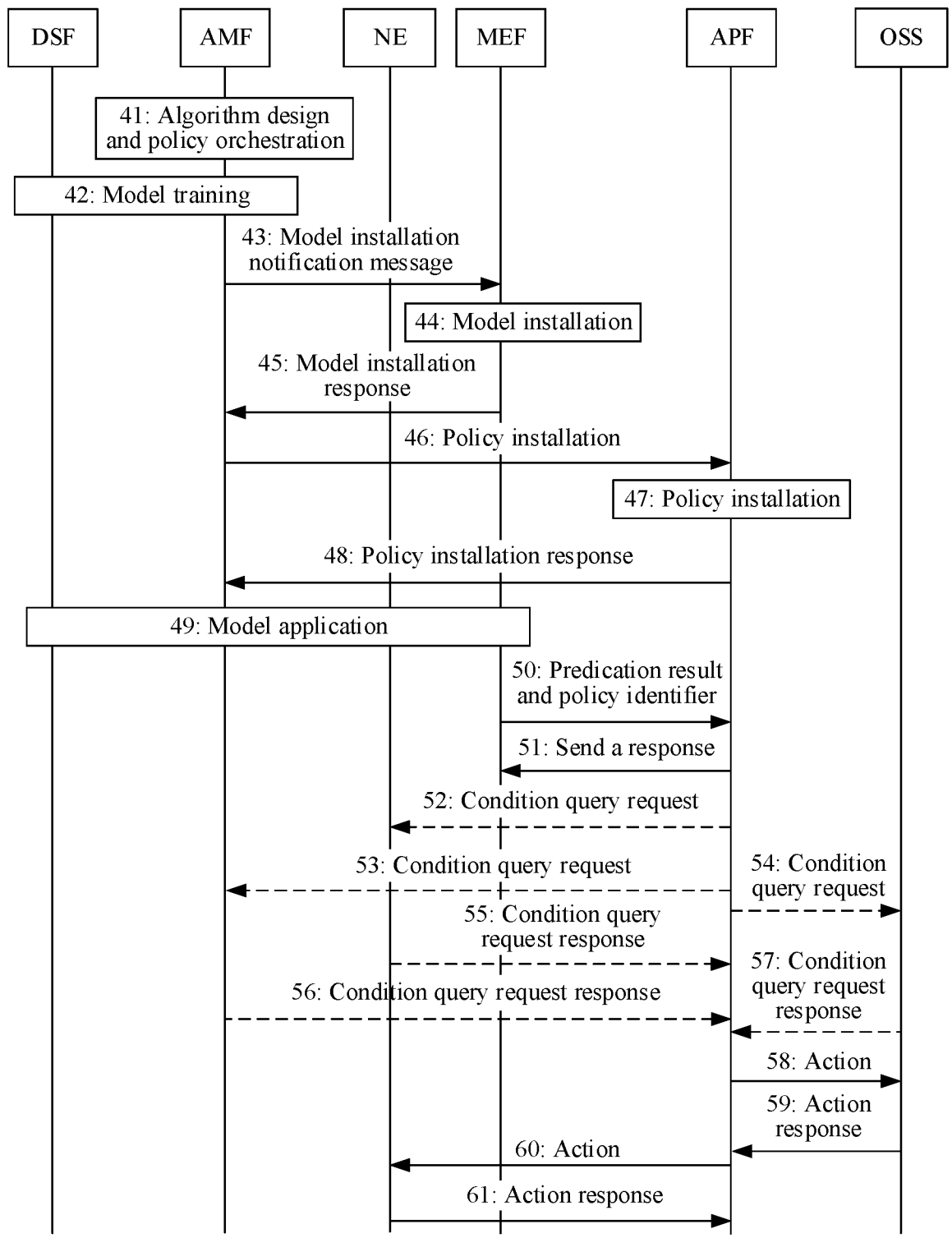
FIG. 16 is another schematic interaction flowchart showing that a plurality of network elements interact with each other to implement a policy-driven method according to an embodiment of this application.

FIG. 16 is another schematic interaction flowchart showing that a plurality of network elements interact with each other to implement a policy-driven method according to an embodiment of this application. The following procedures are mainly included.

41: Algorithm design and policy orchestration.

42: Model training.

43: An AMF sends a model installation notification message to an MEF.

44: Model installation.

45: The MEF sends a model installation response.

46: The AMF sends a policy installation message to an APF.

47: The APF installs a policy sent by the AMF.

48: The APF sends a policy installation response to the AMF.

49: Model application.

50: The MEF sends a prediction result and a policy identifier to the APF.

51: The APF sends a response to the MEF, to indicate that the APF receives the prediction result and the policy identifier.

If condition information in the policy received by the APF is non-null, the APF sends a condition query request carrying the condition information to an NE, the AMF, or an OSS.

Steps 41 to 51 are the same as step 21 to step 31 in the foregoing embodiment, and details are not described herein.

52: The APF sends a condition query request to the NE, where the condition query request includes to-be-queried condition information.

53: The APF sends a condition query request to the AMF, where the condition query request includes to-be-queried condition information.

54: The APF sends a condition query request to the OSS, where the condition query request includes to-be-queried condition information.

Only one of step 52, step 53, or step 54 needs to be performed.

The APF may send the condition query request to only one of the NE, the AMF, or the OSS. During actual application, the APF may not need to send the condition query request to all of the NE, the AMF, and the OSS. This is merely an example for description herein, and is not intended to limit the embodiments of this application.

55: The NE sends a query result to the APF.

After receiving the condition query request of the APF, the NE may query whether the condition information is satisfied, and send the query result.

56: The AMF sends a query result to the APF.

57: The OSS sends a query result to the APF.

Only one of step 55, step 56, or step 57 needs to be performed.

The query result carries whether the condition information is satisfied. For example, if the query result is true (true), it indicates that the condition information is satisfied; or if the query result is false (false), it indicates that the condition information is not satisfied.

58: The APF sends an action to the OSS.

59: The OSS sends a response of the action to the APF.

After obtaining the action based on the policy and the prediction result, the APF delivers the action to the corresponding NE or OSS. For example, after the APF determines, from the NE or the OSS, that encryption application experience is poor. When the condition information is that cell RSRP is less than a threshold or a cell Ec/Io is less than a threshold, it indicates that coverage is insufficient, and step 58 is performed to prompt the OSS to optimize the coverage.

60: The APF sends an action to the NE.

The NE may include a PCF. For example, when the condition information is that a packet loss rate is greater than a threshold, it indicates network congestion, and step 60 is performed to indicate the PCF to control quality of service.

61: The NE sends a response of the action to the APF.

Only one group of steps 58 and 59 and steps 60 and 61 needs to be performed. For example, steps 58 and 59 may be performed, or steps 60 and 61 may be performed.

It should be noted that, in addition to performing step 52, step 53, or step 54, when receiving the policy installation message in step 46, based on the condition information included in the policy, the APF may further subscribe to a notification from the NE, the AMF, or the OSS: When the condition information is satisfied, the NE, the AMF, or the OSS sends the notification to the APF. It may be understood that after subscribing to the notification from the NE, the AMF, or the OSS, the APF may not need to perform step 52, step 53, and step 54.

In the embodiments of this application, more abundant network statuses, such as a poor user experience event, may be identified by using big data and machine learning, to assist in more accurate policy control. For example, an output of a model is used as an input for a PCF to make a policy decision. In the embodiments of this application, an event-condition-action (Event-Condition-Action, ECA) model may be used, so that in a wireless network, not only a model that directly indicates a parameter configuration may be used, but also a model that indicates occurrence of a network event may be used. This expands an application scope of the machine learning in a wireless network.

In some other embodiments of this application, when one model triggers a plurality of policies, policies are orchestrated in advance. The model installation notification message in step 43 shown in FIG. 16 may further carry an order of execution (order of execution) corresponding to each policy. In step 50, the MEF may further send the order of execution corresponding to each policy to the APF. Therefore, during policy execution, the APF delivers a corresponding action to a target network element according to the order of execution. In this way, actions in the policies are ensured to be sequentially executed. Therefore, according to this embodiment of this application, a plurality of policies may be triggered by one model.

When one model triggers a plurality of policies, in some other embodiments of this application, the model installation notification message in step 43 shown in FIG. 16 may further carry a priority (priority) of the model. In step 50, the MEF may further send the priority of the model to the APF. Therefore, during policy execution, the APF obtains a corresponding action based on the priority of the model, a prediction result of a model with a highest priority, and the policy, and delivers the corresponding action to the PCF or the OSS. In the embodiments of this application, different models use a series of common policy-driven methods, to reduce policy redundancy and orchestration complexity, and a plurality of models trigger one policy.

Figure 17:
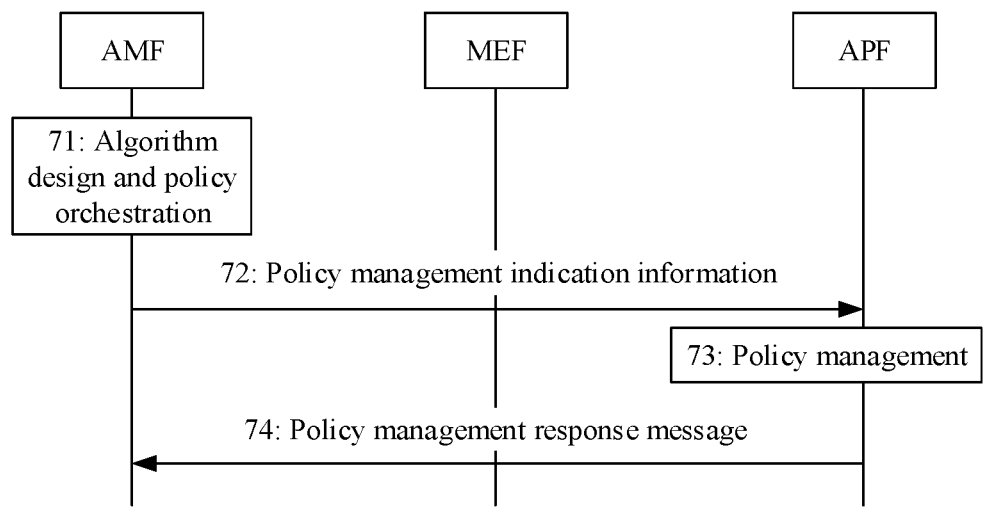
FIG. 17 is a schematic interaction flowchart showing that a plurality of network elements interact with each other to manage a policy according to an embodiment of this application.

FIG. 17 is a schematic interaction flowchart showing that a plurality of network elements interact with each other to manage a policy according to an embodiment of this application. The following processes are mainly included.

71: Algorithm design and policy orchestration.

A policy is orchestrated by a user, and then imported to an AMF.

72: The AMF sends policy management indication information to an APF. The policy management indication information specifically carries an operation type for the policy, for example, policy installation, policy update, policy deletion, policy activation, policy deactivation, or policy query. During policy installation or update, a policy identifier, and an event, condition information, and action information that are corresponding to the policy identifier may be carried. During policy deletion, policy activation, policy deactivation, or policy query, only the policy identifier needs to be carried.

73: The APF performs policy installation, update, deletion, activation, deactivation, or query based on the policy management indication information sent by the AMF.

74: The APF sends policy management response information to the AMF. For example, a policy query response carries a policy event, condition information, and action information.

In the embodiments of this application, a policy update or deletion interface may be configured, to facilitate policy management. A policy update or deletion function is added to improve a policy management function.

It may be learned from descriptions of the foregoing examples that, in the embodiments of this application, the AMF sends a model message to the MEF, and the model message carries the policy identifier, and optionally further carries the priority of the model or the order of execution of the policy. The AMF sends the policy message to the APF. The message carries the policy identifier, the event, the condition information, and the action information. The MEF sends the prediction result and the policy identifier to the APF. Optionally, the MEF further sends the priority of the model or the order of execution of the policy to the APF. The APF sends the query request or the subscription request to the AMF, the OSS, or the NE. The APF receives, from the AMF, the OSS, or the NE, the query result or the subscription response that each include whether the condition information is satisfied. The APF obtains the action through matching based on the policy and the prediction result, and sends an action indication to a related target network element such as the NE, the OSS, the DSF, or the MEF.

In the embodiments of this application, by using big data and machine learning, more abundant network statuses are identified, to assist in more accurate policy control. Different models use a series of common policy-driven methods to reduce policy redundancy and orchestration complexity. Models in the MEF are decoupled to avoid model orchestration.

It should be noted that, for brief description, the foregoing method embodiments are represented as a series of actions. However, a person skilled in the art should appreciate that this application is not limited to the described sequence of the actions, because according to this application, some steps may be performed in other orders or simultaneously. It should be further appreciated by a person skilled in the art that the embodiments described in this specification all belong to preferred embodiments, and the described actions and modules are not necessarily required by this application.

To better implement the foregoing solutions of the embodiments of this application, the following further provides related apparatuses for implementing the foregoing solutions.

Figure 18:
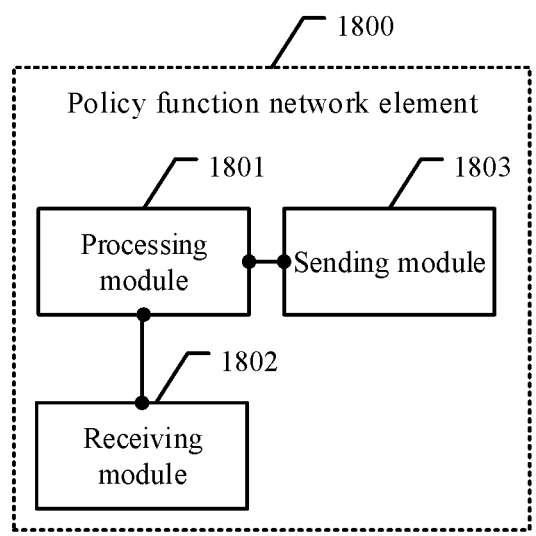
FIG. 18 is a schematic structural diagram of composition of a policy function network element according to an embodiment of this application.

FIG. 18 shows a policy function network element 1800 according to an embodiment of this application. The policy function network element 1800 may include a processing module 1801, a receiving module 1802, and a sending module 1803.

The processing module 1801 is configured to obtain at least one policy from a modeling function network element.

The receiving module 1802 is configured to receive a first policy identifier triggered by a first model from a prediction function network element, where the first policy identifier is used to identify a first policy.

The processing module 1801 is further configured to determine the first policy in the at least one policy based on the first policy identifier, where the first policy includes action information corresponding to a first action.

The processing module 1801 is further configured to execute the first action in the first policy.

The sending module 1803 is configured to send an execution result of the first action to a data service function network element or the prediction function network element, where the execution result of the first action is used as input data of a second model.

In some embodiments of this application, the sending module 1803 is specifically configured to send the execution result of the first action to the data service function network element via an interface between the policy function network element and the data service function network element.

In some embodiments of this application, the receiving module 1802 is further configured to receive a prediction result of the first model from the prediction function network element. The processing module 1801 is specifically configured to execute the first action that is in the first policy and that corresponds to the prediction result.

In the foregoing embodiment of this application, the policy function network element may determine the first policy in the at least one policy based on the first policy identifier, and the policy function network element executes the first action in the first policy, and uses the execution result of the first action as the input data of the second model. In this way, the first model and the second model may be jointly executed, and a plurality of models may not need to be coupled together, so that a single model can be reused, to improve model reuse efficiency. In addition, collaboration of a plurality of network elements may be implemented among the policy function network element, the modeling function network element, the prediction function network element, and the data service function network element. With reference to an ML technology, abundant network information may be used to provide a policy that is most suitable for a current network status, and data information in a wireless network may be converted into a policy by using a plurality of models.

In the policy function network element 1800 provided in this embodiment of this application, the processing module 1801 is configured to obtain at least one policy from a modeling function network element;

the receiving module 1802 is configured to receive a first policy identifier triggered by a first model from a prediction function network element, where the first policy identifier is used to identify a first policy;

the processing module 1801 is further configured to determine the first policy in the at least one policy based on the first policy identifier, where the first policy includes action information corresponding to a first action and condition information for executing the first action in the first policy; and the sending module 1803 is configured to trigger a target network element indicated by the action information to execute the first action in the first policy.

In some embodiments of this application, the sending module 1803 is further configured to send the condition information to the communications network element based on the condition information, to query whether the condition information is satisfied.

Alternatively, the sending module is further configured to send the condition information to the communications network element to subscribe to a notification: When the condition information is satisfied, the communications network element notifies the policy function network element.

The communications network element includes at least one of the following network elements: a network element NE, an operations support system OSS, or the modeling function network element.

In some embodiments of this application, the processing module 1801 is further configured to: when the condition information is satisfied, trigger the target network element indicated by the action information to execute the first action in the first policy.

In some embodiments of this application, the first policy may include one or more pieces of condition information. When the first policy includes a plurality of pieces of condition information, the policy function network element 1800 may query, from the communications network element, whether the plurality of pieces of condition information are satisfied. The communications network element may query whether each piece of condition information is satisfied, and the communications network element may generate a query result for each piece of condition information. The query result includes whether the condition information is satisfied. The policy function network element 1800 may determine satisfied condition information based on the query result sent by the communications network element, and trigger the target network element indicated by the action information to execute the first action in the first policy.

In some embodiments of this application, the first policy may include one or more pieces of condition information. When the first policy includes a plurality of pieces of condition information, the policy function network element 1800 may subscribe to, from the communications network element, a notification about whether the plurality of pieces of condition information are satisfied. The communications network element may query whether each piece of condition information is satisfied, and the communications network element may notify the policy function network element of condition information that is satisfied. The policy function network element 1800 may determine satisfied condition information based on the notification sent by the communications network element, and trigger the target network element indicated by the action information to execute the first action in the first policy.

In some embodiments of this application, the processing module 1801 is further configured to trigger, based on an order of execution corresponding to the first policy, the target network element to execute the first action in the first policy.

In some embodiments of this application, the processing module 1801 is further configured to determine, based on a priority identifier corresponding to the first model, that a priority of the first model is a highest priority.

The sending module 1803 is specifically configured to trigger the target network element indicated by the first action corresponding to the first model with the highest priority to execute the first action in the first policy.

In some embodiments of this application, the receiving module 1802 is further configured to receive policy management indication information from the modeling function network element, where the policy management indication information includes a first to-be-managed policy identifier and a first management operation, or the policy management indication information includes a second to-be-managed policy identifier, a second management operation, and a to-be-managed policy.

The first management operation includes at least one of the following operations: a policy deletion operation, a policy activation operation, a policy deactivation operation, or a policy query operation.

The second management operation includes a policy installation operation and/or a policy update operation, and the to-be-managed policy includes an event, condition information, and action information that are corresponding to the second to-be-managed policy identifier.

In some embodiments of this application, the receiving module 1802 is further configured to receive a prediction result of the first model from the prediction function network element. The processing module 1801 is specifically configured to determine the first action that is in the first policy and that corresponds to the prediction result.

In addition, the policy function network element 1800 may further perform another operation in FIG. 3 or FIG. 4. Details are not described herein again.

In the foregoing embodiment of this application, the policy function network element may determine the first policy in the at least one policy based on the first policy identifier. The first policy includes the action information and the condition information for executing the first action in the first policy. The policy function network element may trigger, according to the first policy, the target network element to execute the first action in the first policy, to implement collaboration of a plurality of network elements among the policy function network element, the modeling function network element, and the prediction function network element. Precise policy control may be implemented with reference to an ML technology and based on different network statuses.

Figure 19:
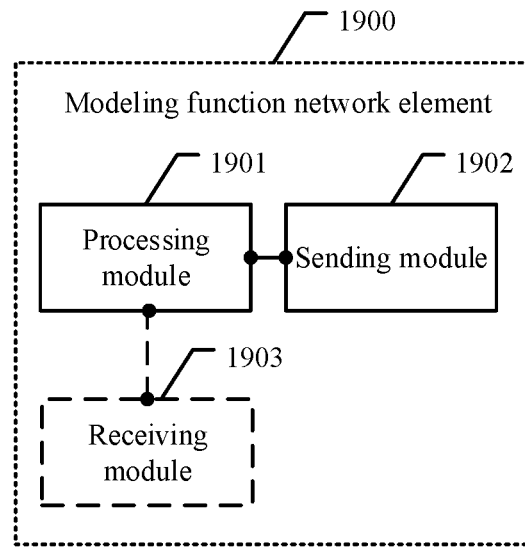
FIG. 19 is a schematic structural diagram of composition of a modeling function network element according to an embodiment of this application.

FIG. 19 shows a modeling function network element 1900 according to an embodiment of this application. The modeling function network element 1900 may include a processing module 1901 and a sending module 1902.

The processing module 1901 is configured to train an initial model based on training sample data provided by a data service function network element, to obtain a trained first model.

The sending module 1902 is configured to send, to a prediction function network element, a model identifier of the first model and a first policy identifier triggered by the first model, where the first policy identifier is used to identify a first policy.

The sending module 1902 is configured to send at least one policy to a policy function network element, where each of the at least one policy includes a policy identifier, an event, condition information, and action information, and the at least one policy is used to determine a first action in the first policy.

In some embodiments of this application, the sending module 1902 is further configured to send policy management indication information to the policy function network element, where the policy management indication information includes a first to-be-managed policy identifier and a first management operation, or the policy management indication information includes a second to-be-managed policy identifier, a second management operation, and a to-be-managed policy.

The first management operation includes at least one of the following operations: a policy deletion operation, a policy activation operation, a policy deactivation operation, or a policy query operation.

The second management operation includes a policy installation operation and/or a policy update operation, and the to-be-managed policy includes an event, condition information, and action information that are corresponding to the second to-be-managed policy identifier.

In some embodiments of this application, as shown in FIG. 19, the modeling function network element 1900 further includes a receiving module 1903.

The receiving module 1903 is configured to: query, based on the query request, whether the condition information is satisfied to generate a query result; and the sending module 1902 is further configured to notify the policy function network element of the query result.

Alternatively, the processing module 1901 is further configured to query, based on the subscription request, whether the condition information is satisfied; and the sending module 1902 is further configured to: when the condition information is satisfied, notify the policy function network element.

In addition, the modeling function network element 1900 may further perform another operation in FIG. 3 or FIG. 4. Details are not described herein again.

In the foregoing embodiment of this application, the modeling function network element may create the first model, and send the model identifier of the first model and the first policy identifier triggered by the first model to the prediction function network element, so that the prediction function network element can install the first model. The modeling function network element further sends the at least one policy to the policy function network element, so that the policy function network element can install the at least one policy, to implement collaboration of a plurality of network elements among the policy function network element, the modeling function network element, and the prediction function network element. Precise policy control may be implemented with reference to an ML technology and based on different network statuses.

Figure 20:
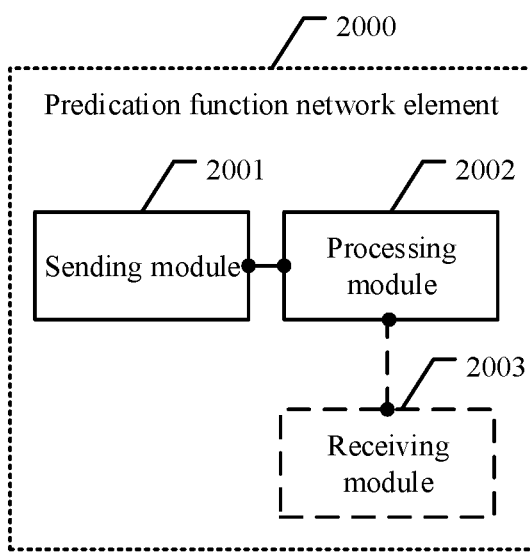
FIG. 20 is a schematic structural diagram of composition of a prediction function network element according to an embodiment of this application.

FIG. 20 shows a prediction function network element 2000 according to an embodiment of this application. The prediction function network element 2000 may include a sending module 2001 and a processing module 2002.

The sending module 2001 is configured to send a first policy identifier triggered by a first model to a policy function network element, where the first policy identifier is used to identify a first policy, and the first policy includes action information corresponding to a first action.

The processing module 2002 is configured to obtain an execution result of the first action.

The processing module 2002 is further configured to: use the execution result of the first action as input data of a second model, and perform prediction by using the second model.

In some embodiments of this application, as shown in FIG. 20, the prediction function network element 2000 further includes a receiving module 2003.

The receiving module 2003 is configured to: receive the execution result of the first action from the policy function network element, or receive the execution result of the first action from a data service function network element.

In some embodiments of this application, the sending module 2001 is further configured to send a prediction result of the first model to the policy function network element, where the prediction result is used to determine the first action in the first policy.

In addition, the prediction function network element 2000 may further perform another operation in FIG. 3 or FIG. 4. Details are not described herein again.

In the foregoing embodiment of this application, the prediction function network element may predict the first model. The prediction function network element may further input the execution result of the first action into the second model, so that the first model and the second model may be jointly executed, and a plurality of models may not need to be coupled together. Therefore, a single model can be reused. This improves model reuse efficiency. In the embodiments of this application, collaboration of a plurality of network elements may be implemented between the policy function network element and the prediction function network element. With reference to an ML technology, abundant network information may be used to provide a policy that is most suitable for a current network status, and data information in a wireless network may be converted into a policy by using a plurality of models.

Figure 21:
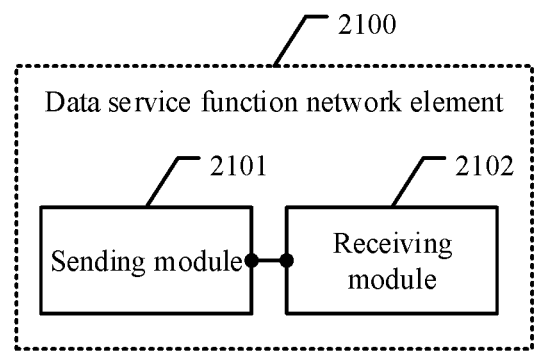
FIG. 21 is a schematic structural diagram of composition of a data service function network element according to an embodiment of this application.

FIG. 21 shows a data service function network element 2100 according to an embodiment of this application. The data service function network element 2100 may include a sending module 2101 and a receiving module 2102.

The sending module 2101 is configured to send training sample data to a modeling function network element. The training sample data is used for training of a first model.

The sending module 2101 is further configured to send input data of the first model to a prediction function network element.

The receiving module 2102 is further configured to receive an execution result of a first action from a policy function network element. The execution result of the first action is associated with the input data of the first model.

The sending module 2101 is further configured to send an execution result of the first action to the prediction function network element. The execution result of the first action is used as input data of a second model.

In some embodiments of this application, the receiving module 2102 is specifically configured to receive the execution result of the first action from the policy function network element via an interface between the policy function network element and the data service function network element.

In addition, the data service function network element 2100 may further perform another operation in FIG. 3 or FIG. 4. Details are not described herein again.

In the foregoing embodiment of this application, the data service function network element may provide data for the modeling function network element and the prediction function network element separately. The execution result of the first action sent by the data service function network element to the prediction function network element may be used as the input data of the second model, so that the first model and the second model may be jointly executed, and a plurality of models may not need to be coupled together. Therefore, a single model can be reused. This improves model reuse efficiency. Collaboration operation of a plurality of network elements may further be implemented among the data service function network element, the policy function network element, and the prediction function network element. With reference to an ML technology, abundant network information may be used to provide a policy that is most suitable for a current network status, and data information in a wireless network may be converted into a policy by using a plurality of models.

It should be noted that content such as information exchange between the modules/units of the apparatus and the execution processes thereof is based on the same idea as the method embodiments of this application, and produces the same technical effects as the method embodiments of this application. For the specific content, refer to the foregoing descriptions in the method embodiments of this application, and the details are not described herein again.

An embodiment of this application further provides a computer storage medium. The computer storage medium stores a program, and the program is used to perform some or all of the steps described in the foregoing method embodiments.

An example in which a policy function network element, a modeling function network element, a prediction function network element, and a data service function network element are independent network elements is used for description below. At least two, three, or four of the policy function network element, the modeling function network element, the prediction function network element, and the data service function network element may be implemented by using one physical device. This is not limited herein.

Figure 22:
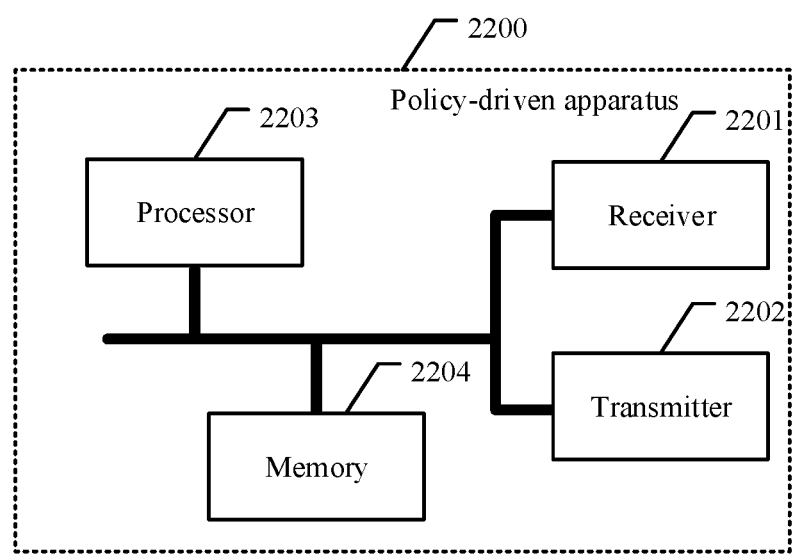
FIG. 22 is a schematic structural diagram of composition of a policy-driven apparatus according to an embodiment of this application.

A policy-driven apparatus provided in an embodiment of this application is first described. Referring to FIG. 22, a policy-driven apparatus 2200 includes:

a receiver 2201, a transmitter 2202, a processor 2203, and a memory 2204 (where the policy-driven apparatus 2200 may include one or more processors 2203, and one processor is used as an example in FIG. 22). In some embodiments of this application, the receiver 2201, the transmitter 2202, the processor 2203, and the memory 2204 may be connected by using a bus or in another manner. For example, the receiver 2201, the transmitter 2202, the processor 2203, and the memory 2204 are connected by using a bus in FIG. 22.

The memory 2204 may include a read-only memory and a random access memory, and provide an instruction and data to the processor 2203. A part of the memory 2204 may further include a non-volatile random access memory (English full name: Non-Volatile Random Access Memory, NVRAM for short). The memory 2204 stores an operating system and an operation instruction, an executable module or a data structure, or a subset thereof, or an extended set thereof. The operation instruction may include various operation instructions, and is used to implement various operations. The operating system may include various system programs to implement various basic services and process hardware-based tasks.

The processor 2203 controls an operation of the policy-driven apparatus, and the processor 2203 may also be referred to as a central processing unit (English full name: Central Processing Unit, CPU for short). In a specific application, components of the policy-driven apparatus are coupled together by using a bus system. In addition to a data bus, the bus system includes a power bus, a control bus, and a status signal bus. However, for clear description, various types of buses in the figure are referred to as a bus system.

The methods disclosed in the foregoing embodiments of this application may be applied to the processor 2203, or implemented by the processor 2203. The processor 2203 may be an integrated circuit chip, and has a signal processing capability. In an implementation process, steps in the foregoing methods may be implemented by using a hardware integrated logical circuit in the processor 2203, or by using instructions in a form of software. The processor 2203 may be a general-purpose processor, a digital signal processor (English full name: digital signal processor, DSP for short), an application-specific integrated circuit (English full name: Application Specific Integrated Circuit, ASIC for short), a field-programmable gate array (English full name: Field-Programmable Gate Array, FPGA for short) or another programmable logical device, a discrete gate or transistor logic device, or a discrete hardware component. The methods, the steps, and logical block diagrams that are disclosed in the embodiments of this application may be implemented. The general-purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 2204, and the processor 2203 reads information in the memory 2204 and completes the steps in the foregoing methods in combination with hardware of the processor.

The receiver 2201 may be configured to: receive input digital or character information, and generate a signal input related to a related setting and function control of the policy-driven apparatus. The transmitter 2202 may include a display device such as a display screen, and the transmitter 2202 may be configured to output digital or character information via an external interface.

In an embodiment of this application, the policy-driven apparatus 2200 may be the foregoing policy function network element, for example, the policy function network element 101 in FIG. 1 or FIG. 2. The processor 2203 is configured to perform the policy-driven method performed by the policy function network element in FIG. 5 to FIG. 6.

In another embodiment of this application, the policy-driven apparatus 2200 may be the foregoing modeling function network element, for example, the modeling function network element 102 in FIG. 1 or FIG. 2. The processor 2203 is configured to perform the policy-driven method performed by the modeling function network element in FIG. 7.

In another embodiment of this application, the policy-driven apparatus 2200 may be the foregoing prediction function network element, for example, the prediction function network element 103 in FIG. 1 or FIG. 2. The processor 2203 is configured to perform the policy-driven method performed by the prediction function network element in FIG. 8.

In another embodiment of this application, the policy-driven apparatus 2200 may be the foregoing data service function network element, for example, the data service function network element 104 in FIG. 1 or FIG. 2. The processor 2203 is configured to perform the policy-driven method performed by the data service function network element in FIG. 9.

In another possible design, when the apparatus is a chip in a policy-driven apparatus, the chip includes a processing unit and a communications unit. The processing unit may be, for example, a processor. The communications unit may be, for example, an input/output interface, a pin, or a circuit. The processing unit may execute a computer executable instruction stored in a storage unit, to enable the chip in the policy-driven apparatus to perform the wireless communication method according to any one of the implementations of the first aspect. Optionally, the storage unit is a storage unit in the chip, for example, a register or a cache; or the storage unit may be a storage unit located outside the chip in the policy-driven apparatus, for example, a read-only memory (read-only memory, ROM) or another type of static storage device capable of storing static information and instructions, or a random access memory (random access memory, RAM). The processor mentioned in any of the foregoing designs may be a general-purpose central processing unit (CPU), a microprocessor, an application-specific integrated circuit (application-specific integrated circuit, ASIC), or one or more integrated circuits configured to control program execution of the wireless communication method according to the first aspect.

In addition, it should be noted that the described apparatus embodiments are merely examples. The units described as separate parts may or may not be physically separate, and parts displayed as units may or may not be physical units, may be located in one position, or may be distributed on a plurality of network elements. Some or all the modules may be selected based on actual needs to achieve the objectives of the solutions of the embodiments. In addition, in the accompanying drawings of the apparatus embodiments provided by this application, connection relationships between the modules indicate that the modules have communication connections with each other, which may be specifically implemented as one or more communications buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. Moreover, a specific hardware structure used to achieve the same function may be of various forms, for example, in a form of an analog circuit, a digital circuit, or a dedicated circuit. However, as for this application, software program implementation is a better implementation in most cases. Based on such an understanding, the technical solutions of this application essentially or the part contributing to the prior art may be implemented in a form of a software product. The software product is stored in a readable storage medium, such as a floppy disk, USB flash drive, removable hard disk, read-only memory (ROM, Read-Only Memory), random access memory (RAM, Random Access Memory), magnetic disk, or optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A policy-driven method, comprising:
   obtaining, by a processor of a policy function network element, at least one policy from a modeling function network element;
   receiving, by the processor of the policy function network element, a first policy identifier triggered by a first model from a prediction function network element, wherein the first policy identifier is used to identify a first policy, wherein the first policy comprises action information corresponding to a first action;
   determining, by the processor of the policy function network element, the first policy in the at least one policy based on the first policy identifier;
   executing, by the processor of the policy function network element, the first action in the first policy; and
   sending, by the processor of the policy function network element, an execution result of the first action to a data service function network element or the prediction function network element, wherein the execution result of the first action is used as input data of a second model.

2. The method according to claim 1, wherein the sending, by the processor of the policy function network element, an execution result of the first action to a data service function network element or the prediction function network element comprises:
   sending, by the processor of the policy function network element, the execution result of the first action to the data service function network element via an interface between the policy function network element and the data service function network element.

3. The method according to claim 1, wherein the method further comprises:
   receiving, by the processor of the policy function network element, a prediction result of the first model from the prediction function network element; and
   the executing, by the processor of the policy function network element, the first action in the first policy comprises:
   executing, by the processor of the policy function network element, the first action that is in the first policy and that corresponds to the prediction result.

4. The method according to claim 1, wherein the method further comprises:
   receiving, by the processor of the policy function network element, policy management indication information from the modeling function network element, wherein the policy management indication information comprises a first to-be-managed policy identifier and a first management operation, or the policy management indication information comprises a second to-be-managed policy identifier, a second management operation, and a to-be-managed policy, wherein
   the first management operation comprises at least one of the following operations: a policy deletion operation, a policy activation operation, a policy deactivation operation, or a policy query operation; and
   the second management operation comprises a policy installation operation and/or a policy update operation, and the to-be-managed policy comprises an event, condition information, and action information that are corresponding to the second to-be-managed policy identifier.

5. The method according to claim 1, wherein the method further comprises:
   receiving, by the processor of the policy function network element, a prediction result of the first model from the prediction function network element; and
   determining, by the processor of the policy function network element, the first action that is in the first policy and that corresponds to the prediction result.

6. A policy-driven method, comprising:
   obtaining, by a processor of a policy function network element, at least one policy from a modeling function network element;
   receiving, by the processor of the policy function network element, a first policy identifier triggered by a first model from a prediction function network element, wherein the first policy identifier is used to identify a first policy, wherein the first policy comprises action information corresponding to a first action and condition information for executing the first action in the first policy;
   determining, by the processor of the policy function network element, the first policy in the at least one policy based on the first policy identifier; and
   triggering, by the processor of the policy function network element, a target network element indicated by the action information to execute the first action in the first policy.

7. The method according to claim 6, wherein the method further comprises:
   sending, by the processor of the policy function network element, the condition information corresponding to the first action to a communications network element, to query whether the condition information is satisfied; or
   sending, by the processor of the policy function network element, the condition information to the communications network element to subscribe to a notification sent by a processor of the communications network element based on determining that the condition information is satisfied, wherein p1 the communications network element comprises at least one of the following network elements: a network element NE, an operations support system OSS, or the modeling function network element.

8. The method according to claim 6, wherein the triggering, by the processor of the policy function network element, a target network element indicated by the action information to execute the first action in the first policy comprises:
   based on the condition information being satisfied, triggering, by the processor of the policy function network element, the target network element indicated by the action information to execute the first action in the first policy.

9. The method according to claim 6, wherein the triggering, by the processor of the policy function network element, a target network element indicated by the action information to execute the first action in the first policy comprises:

triggering, by the processor of the policy function network element according to an order of execution corresponding to the first policy, the target network element to execute the first action in the first policy.

10. The method according to claim 6, wherein the triggering, by the processor of the policy function network element, a target network element indicated by the action information to execute the first action in the first policy comprises:

determining, by the processor of the policy function network element based on a priority identifier corresponding to the first model, that a priority of the first model is a highest priority; and triggering, by the processor of the policy function network element, the target network element indicated by the first action corresponding to the first model with the highest priority to execute the first action in the first policy.

11. An apparatus configured to operate a policy function network element comprising:

a processor; and a non-transitory memory coupled to the processor and having processor-executable instructions stored thereon, which when executed, cause the processor to:

obtain at least one policy from a modeling function network element;

receive a first policy identifier triggered by a first model from a prediction function network element, wherein the first policy identifier is used to identify a first policy, wherein the processor-executable instructions, which when executed, further cause the processor to determine the first policy in the at least one policy based on the first policy identifier, wherein the first policy comprises action information corresponding to a first action and condition information for executing the first action in the first policy; and trigger a target network element indicated by the action information to execute the first action in the first policy.

12. The apparatus configured to operate the policy function network element according to claim 11, wherein the processor-executable instructions, which when executed, further cause the processor to: send the condition information corresponding to the first action to a communications network element, to query whether the condition information is satisfied; or send the condition information to the communications network element to subscribe to a notification that is sent by a processor of the communications network element based on determining that the condition information is satisfied, wherein the communications network element comprises at least one of the following network elements: a network element NE, an operations support system OSS, or the modeling function network element.

13. The apparatus configured to operate the policy function network element according to claim 11, wherein the processor-executable instructions, which when executed, further cause the processor to, based on the condition information being satisfied, trigger the target network element indicated by the action information to execute the first action in the first policy.

14. The apparatus configured to operate the policy function network element according to claim 11, wherein the processor-executable instructions, which when executed, further cause the processor to trigger, according to an order of execution corresponding to the first policy, the target network element to execute the first action in the first policy.

15. The apparatus configured to operate the policy function network element according to claim 11, wherein the processor-executable instructions, which when executed, further cause the processor to: determine, based on a priority identifier corresponding to the first model, that a priority of the first model is a highest priority; and trigger the target network element indicated by the first action corresponding to the first model with the highest priority to execute the first action in the first policy.

16. The apparatus configured to operate the policy function network element according to claim 11, wherein the processor-executable instructions, which when executed, further cause the processor to: receive a prediction result of the first model from the prediction function network element; and determine the first action that is in the first policy and that corresponds to the prediction result.

* * * * *

UNITED STATES PATENT AND TRADEMARK OFFICE
CERTIFICATE OF CORRECTION

PATENT NO. : 11,290,344 B2  
APPLICATION NO. : 16/988313  
DATED : March 29, 2022  
INVENTOR(S) : Wang et al.

Page 1 of 1

It is certified that error appears in the above-identified patent and that said Letters Patent is hereby corrected as shown below:

In the Claims

Claim 7: Column 56, Line 54: "satisfied, wherein p1 the communications network ele-" should read -- satisfied, wherein the communications network ele- --.

Claim 7: Column 56, Line 56: "elements: a network element NE, an operations support" should read -- elements: a network element (NE), an operations support --.

Claim 7: Column 56, Line 57: "system OSS, or the modeling function network ele-" should read -- system (OSS), or the modeling function network ele- --.

Claim 12: Column 58, Line 12: "element NE, an operations support system OSS, or the" should read -- element (NE), an operations support system (OSS), or the --.

Signed and Sealed this  
Sixteenth Day of August, 2022

Katherine Kelly Vidal  
*Director of the United States Patent and Trademark Office*